United States Patent
Bull et al.

(10) Patent No.: US 11,533,781 B2
(45) Date of Patent: Dec. 20, 2022

(54) POLICY MAPPING METHODS AND APPARATUS FOR USE IN INTERCONNECTING SOFTWARE-DEFINED WIDE AREA NETWORK (SD-WAN) FABRICS WITH MOBILE NETWORKS FOR COMMUNICATIONS WITH UES

(71) Applicant: Cisco Technology, Inc., San Jose, CA (US)

(72) Inventors: Oliver James Bull, Bristol (GB); Louis Gwyn Samuel, Wiltshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 17/147,970

(22) Filed: Jan. 13, 2021

(65) Prior Publication Data
US 2021/0136871 A1     May 6, 2021

Related U.S. Application Data

(62) Division of application No. 16/181,142, filed on Nov. 5, 2018, now Pat. No. 10,932,322.
(Continued)

(51) Int. Cl.
H04L 12/46    (2006.01)
H04W 92/02    (2009.01)
H04W 28/02    (2009.01)

(52) U.S. Cl.
CPC ......... H04W 92/02 (2013.01); H04L 12/4641 (2013.01); H04W 28/0268 (2013.01)

(58) Field of Classification Search
CPC .............. H04W 92/02; H04W 28/0268; H04L 12/4641
See application file for complete search history.

(56) References Cited

U.S. PATENT DOCUMENTS 7,535,926 B1 * 5/2009 Deshpande ............. H04L 69/16
370/395.6
9,047,143 B2   6/2015 Pruss et al.
(Continued)

FOREIGN PATENT DOCUMENTS

WO    2017/083975 A1   5/2017
WO    2017/205755 A1   11/2017
WO    2017/220132 A1   12/2017

OTHER PUBLICATIONS

International Search Report and Written Opinion in corresponding International Application No. PCT/US2019/017960, dated Apr. 25, 2019, 12 pages.
(Continued)

Primary Examiner — Edan Orgad
Assistant Examiner — Malick A Sohrab

(57) ABSTRACT

In one illustrative example, an interface between a user plane function (UPF) instance of a mobile network and a tunnel router endpoint of an enterprise software-defined wide area network (SD-WAN) fabric is provided. The UPF instance may be part of a network slice that is (uniquely) associated with an enterprise of the enterprise SD-WAN. A plurality of mappings between policies associated with different QoS flows via the UPF instance and SD-WAN policies associated with different virtual private networks (VPNs) of the SD-WAN fabric may be maintained. Each VPN of the SD-WAN fabric may be associated with a different underlying transport mechanism that satisfies characteristics of a specific SD-WAN policy. Communications for user equipment (UE) in the mobile network may be facilitated across the SD-WAN fabric based on the policy mappings.

20 Claims, 23 Drawing Sheets

Related U.S. Application Data

(60) Provisional application No. 62/634,646, filed on Feb. 23, 2018.

(56) References Cited

U.S. PATENT DOCUMENTS

| | | | |
|---|---|---|---|
| 9,608,901 B2 | 3/2017 | Haddad et al. | |
| 2015/0333930 A1 | 11/2015 | Aysola et al. | |
| 2016/0344604 A1* | 11/2016 | Raleigh | H04L 41/0893 |
| 2017/0063782 A1* | 3/2017 | Jain | H04L 63/08 |
| 2017/0332421 A1 | 11/2017 | Sternberg et al. | |
| 2018/0262424 A1 | 9/2018 | Roeland et al. | |
| 2019/0158985 A1* | 5/2019 | Dao | H04L 67/147 |
| 2019/0208573 A1* | 7/2019 | Yang | H04W 76/11 |
| 2019/0268973 A1 | 8/2019 | Bull et al. | |
| 2019/0357129 A1* | 11/2019 | Park | H04W 60/04 |

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.0.0, Dec. 2017, 181 pages.

3GPP Organizational Partners, "3rd Generation Partnership Project; Technical Specification Group Services and System Aspects; Telecommunication management; Study on management and orchestration of network slicing for next generation network (Release 15)", 3GPP TR 28.801 V15.1.0, Jan. 2018, 75 pages.

Examination Report in counterpart European Patent Application No. 19708725.7, dated Mar. 30, 2022, 4 pages.

Examination Report in counterpart European Patent Application No. 19708725.7, dated Aug. 6, 2021, 4 pages.

\* cited by examiner

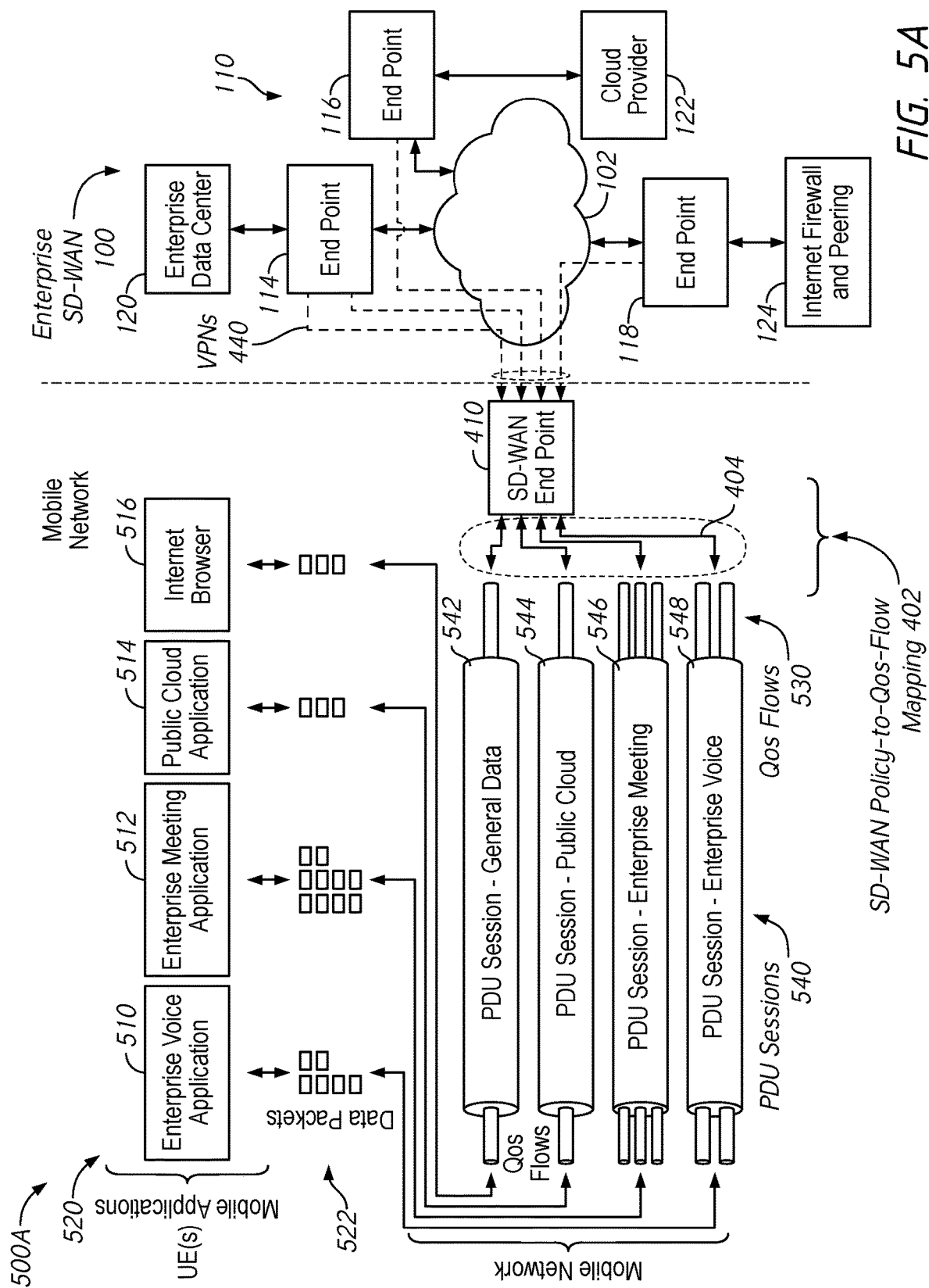

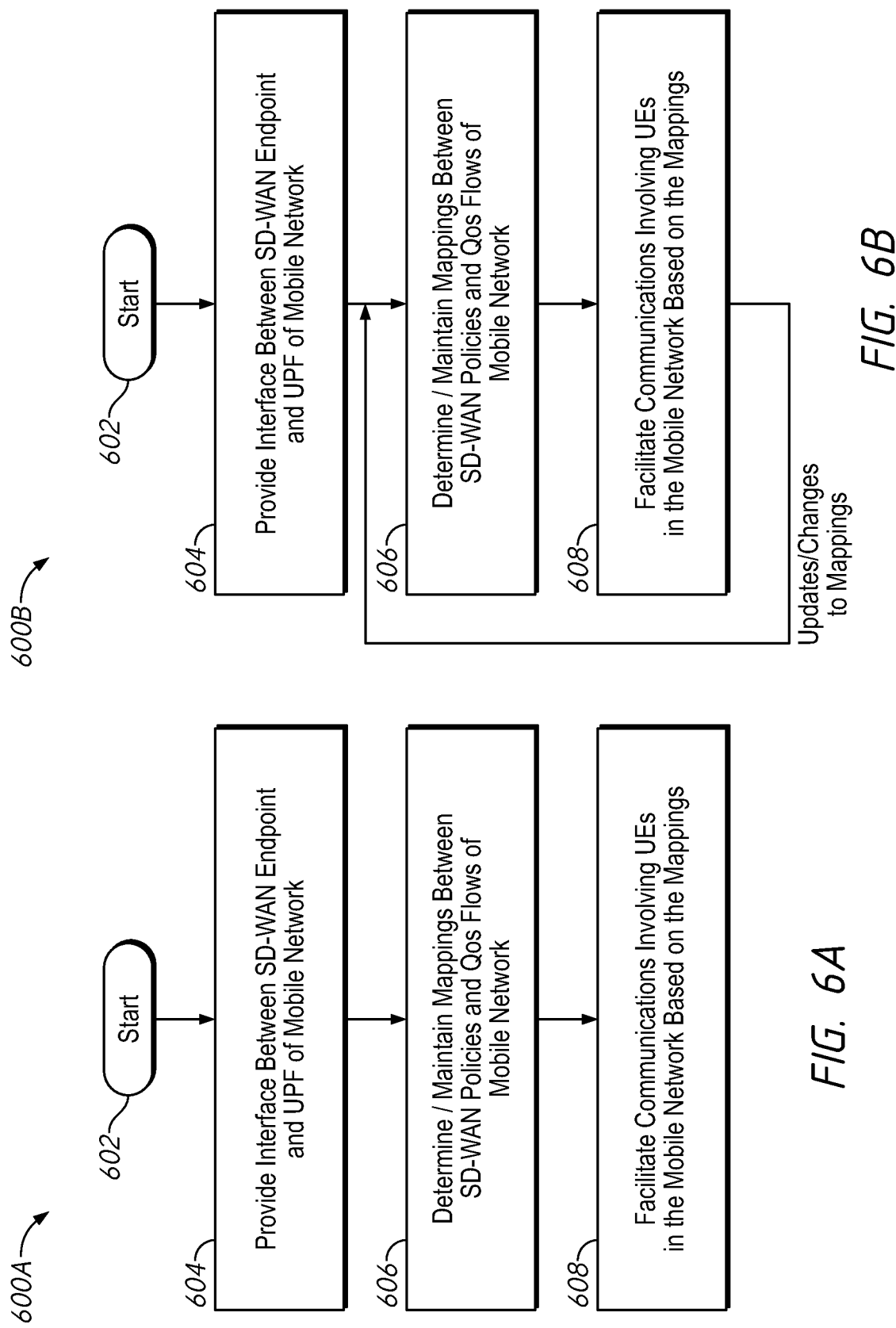

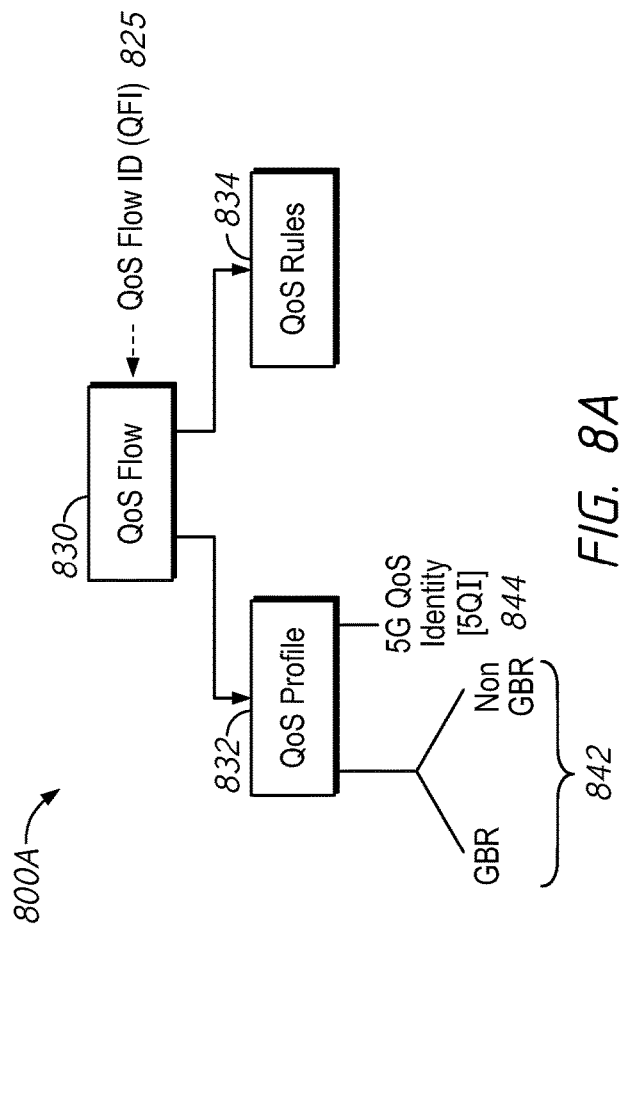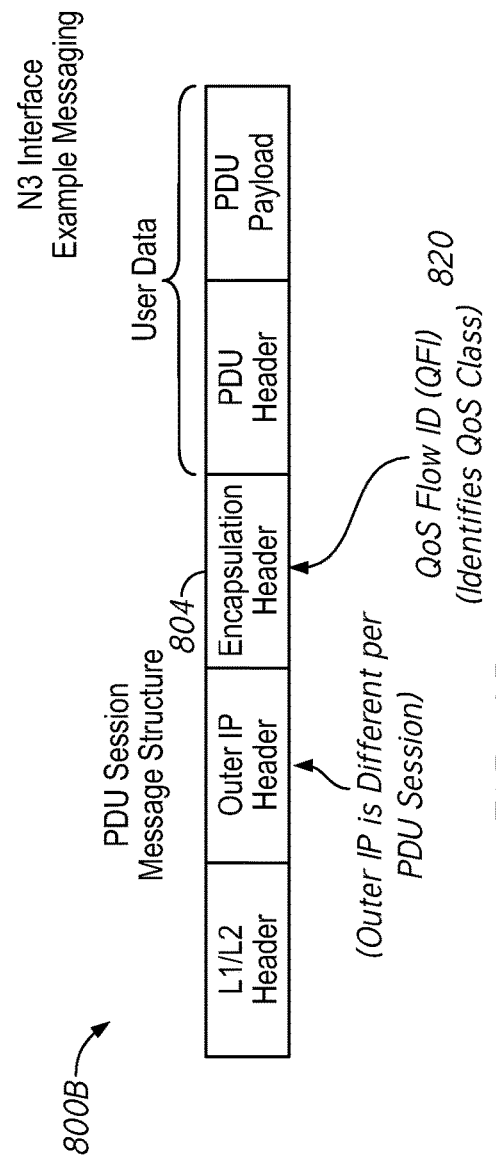
FIG. 8A
FIG. 8B

800C

| 5QI Value | Resource Type | Default Priority Level | Packet Delay Budget | Packet Error Rate | Default Maximum Data Burst Volume | Default Averaging Window |
|---|---|---|---|---|---|---|
| 10 | Delay Critical GBR | 11 | 5 ms | $10^{-5}$ | 160 B | TBD |
| 11 | | 12 | 10 ms | $10^{-6}$ | 320 B | TBD |
| 12 | | 13 | 20 ms | $10^{-5}$ | 640 B | TBD |
| 16 | | 18 | 10 ms | $10^{-4}$ | 255 B | TBD |
| 17 | | 19 | 10 ms | $10^{-4}$ | 1358 B | TBD |
| 1 | GBR | 20 | 100 ms | $10^{-2}$ | N/A | TBD |
| 2 | | 40 | 150 ms | $10^{-3}$ | N/A | TBD |
| 3 | | 30 | 50 ms | $10^{-3}$ | N/A | TBD |
| 4 | | 50 | 300 ms | $10^{-6}$ | N/A | TBD |
| 65 | | 7 | 75 ms | $10^{-2}$ | N/A | TBD |
| 66 | | 20 | 100 ms | $10^{-2}$ | N/A | TBD |
| 75 | | 25 | 50 ms | $10^{-2}$ | N/A | TBD |
| E | | 18 | 10 ms | $10^{-4}$ | 255 B | TBD |
| F | | 19 | 10 ms | $10^{-4}$ | 1358 B | TBD |
| 5 | Non-GBR | 10 | 100 ms | $10^{-6}$ | N/A | N/A |
| 6 | | 60 | 300 ms | $10^{-6}$ | N/A | N/A |
| 7 | | 70 | 100 ms | $10^{-3}$ | N/A | N/A |
| 8 | | 80 | 300 ms | $10^{-6}$ | N/A | N/A |
| 9 | | 90 | 300 ms | | N/A | N/A |
| 69 | | 5 | 60 ms | $10^{-6}$ | N/A | N/A |
| 70 | | 55 | 200 ms | $10^{-6}$ | N/A | N/A |
| 79 | | 65 | 50 ms | $10^{-2}$ | N/A | N/A |
| 80 | | 66 | 10 ms | $10^{-6}$ | N/A | N/A |

FIG. 8C

POLICY MAPPING METHODS AND APPARATUS FOR USE IN INTERCONNECTING SOFTWARE-DEFINED WIDE AREA NETWORK (SD-WAN) FABRICS WITH MOBILE NETWORKS FOR COMMUNICATIONS WITH UES

CROSS-REFERENCE TO RELATED APPLICATIONS

This application is a divisional of U.S. patent application Ser. No. 16/181,142, filed Nov. 5, 2018, which claims priority to U.S. Provisional Patent Application No. 62/634,646, filed on Feb. 23, 2018, which are hereby incorporated by reference in their entireties.

TECHNICAL FIELD

The present disclosure relates generally to software-defined wide area networks (SD-WANs) and mobile networks, and more particularly to methods and apparatus for use in interconnecting SD-WAN fabrics with mobile networks for communications with UEs based on policy mappings.

BACKGROUND

Enterprise software-defined (SD) wide area network (WAN) (SD-WAN) fabrics are made up of endpoints with multiple virtual private networks (VPNs) utilizing point-to-point encryption overlay tunnels (e.g. IPsec). These tunnels traverse one or more underlay networks utilizing a variety of connection methods (e.g. dedicated MPLS links, broadband internet or cellular networks). The endpoints route the traffic from the LAN side over the SD-WAN VPNs based on routing policies, performance measurements, data packet source and packet classification. The SD-WAN fabric is terminated by the endpoints to bridge between the WAN side overlay and the local LAN side network.

Increasingly, mobile devices are becoming critical components of business operations. A mobile device or user equipment (UE) (e.g. a smartphone, cellular device, a cellular IoT device, a cellular connected router, etc.) connected to a cellular network is unable to connect to the SD-WAN fabric, as its data flow traverses the network of a mobile network operator (MNO) before offloading to the Internet backbone for routing to its ultimate destination. A direct connection between mobile device and a WAN fabric may be implemented with use of a dedicated VPN from mobile device to a secure gateway; however, this would be an inefficient usage of mobile network resources (e.g. the radio interface) and create an additional, completely separate device management solution, thereby increasing complexity of operation.

Accordingly, there is a need to provide features and solutions to extend enterprise SD-WANs to mobile devices or UEs operating in mobile networks.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5B are illustrative representations of systems which interconnect SD-WAN fabrics with mobile networks for communication with UEs with use of policy mappings, according to at least some implementations of the present disclosure, with further illustrative detail regarding the UE applications, packet data unit (PDU) sessions, and Quality of Service (QoS) flows of a specific example;

FIGS. 6A-6B are flowcharts for describing methods for use in interconnecting SD-WAN fabrics with mobile networks with use of policy mappings according to some implementations of the present disclosure;

FIG. 8A is an illustrative representation of relationships between QoS information in the mobile network;

FIG. 8B is an example of a PDU session message structure of a PDU session message over an N3 interface between a gNB and a UPF, where the PDU session message may include an encapsulation header having a QoS Flow ID (QFI);

FIG. 8C is a table which provides example characteristics of QoS flows according to different 5G QoS Identity (5QI) values;

DESCRIPTION OF EXAMPLE EMBODIMENTS

Figure 1:
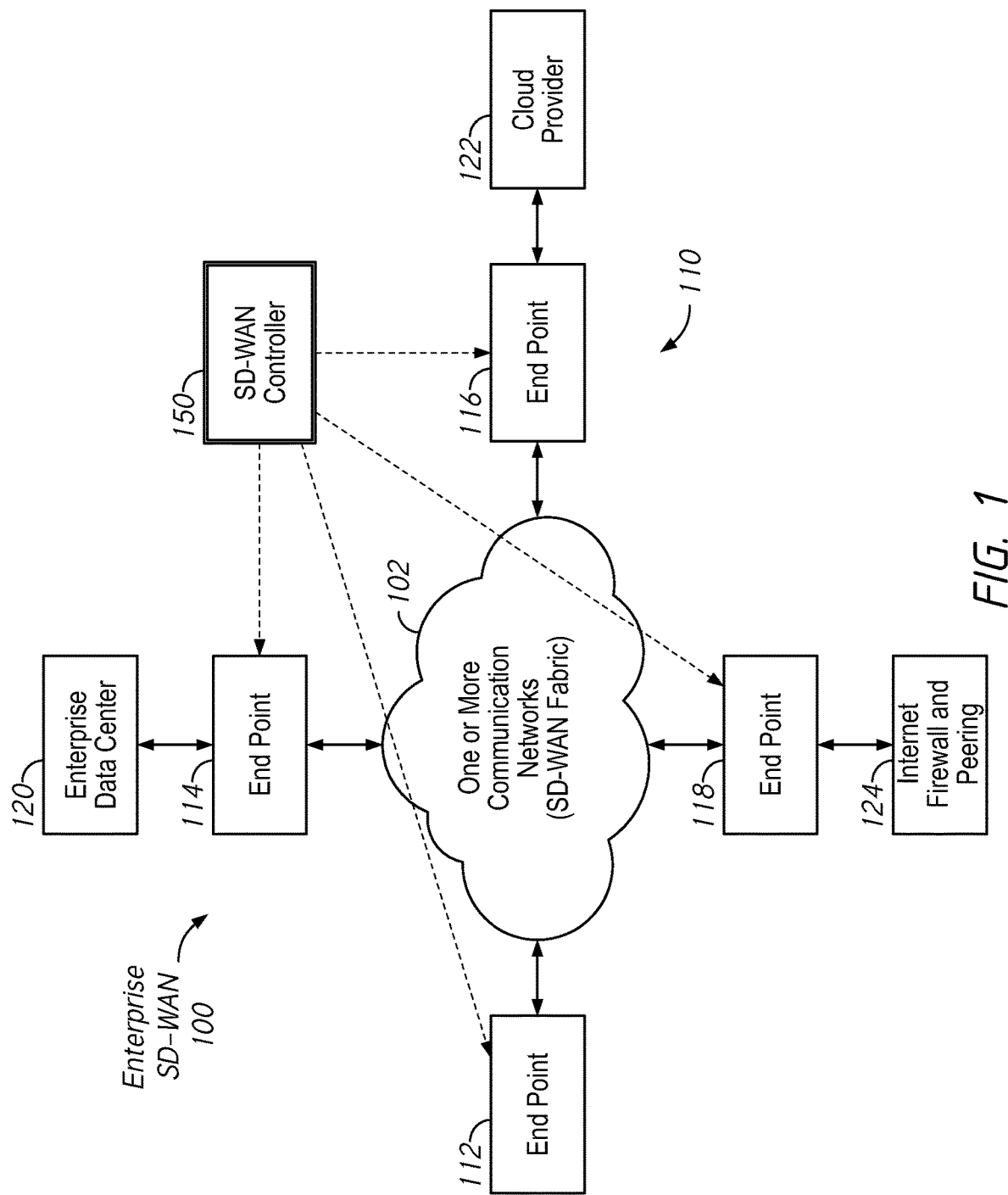
FIG. 1 is an illustrative diagram of a software-defined wide area network (SD-WAN) (e.g. an enterprise SD-WAN) involving one or more communication networks and a plurality of endpoints (or tunnel router endpoints)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in interconnecting software-defined wide area network (SD-WAN) fabrics with mobile networks for communications with user equipment (UEs) based on policy data mappings are described herein.

In one illustrative example, an interface between a user plane function (UPF) instance of a mobile network and a tunnel router endpoint of an enterprise software-defined wide area network (SD-WAN) fabric is provided. The UPF instance may be part of a network slice that is (uniquely) associated with an enterprise of the enterprise SD-WAN. The tunnel router endpoint may be configured to process communications for hosts according to a network overlay protocol in concert with other tunnel router endpoints to facilitate a plurality of network overlays comprising virtual private networks (VPNs) of the enterprise SD-WAN fabric. A plurality of mappings between policies associated with different QoS flows via the UPF instance and SD-WAN policies associated with different VPNs of the SD-WAN fabric may be maintained. Each one of at least some of the VPNs may be associated with a different underlying transport mechanism that satisfies characteristics of a specific SD-WAN policy. Communications for UEs in the mobile network may be facilitated across the SD-WAN fabric based on the policy mappings.

More detailed and alternative techniques and implementations are provided herein as will be described below.

EXAMPLE EMBODIMENTS

According to some implementations of the present disclosure, techniques for the integration of a 5G network slice, UPF instance with an SD-WAN endpoint may be provided in order to extend an enterprise SD-WAN fabric to mobile devices with an integrated policy. Here, a unique 5G network slice, identified by Single-Network Slice Selection Assistance Information (S-NSSAI) having a specific Slice/Service Type and Slice Differentiator, may be defined. This slice configuration may be provisioned in the mobile device which requests access to it in its registration procedure with the mobile network. This network slice includes the UPF instance associated with the enterprise, which terminates the mobile data associations across the access network from the mobile device and classed as PDU Sessions.

Within these PDU Sessions are Quality of Service (QoS) flows, where application traffic is categorized and mapped into configured QoS flows based on a PDU Session configuration established between the mobile device and core network (i.e. an Access Management Function or "AMF" and Session Management Function or "SMF"). A QoS flow is associated with a 5G QoS Indicator (5GI) which defines the characteristics of the routing and forwarding treatments of the data packets through the mobile network. On the other hand, the SD-WAN endpoint has routing policies configured to connect cellular-side traffic to WAN-side fabric. The WAN-side fabric may be made up of a number of overlay VPNs that connect to other endpoints of the WAN fabric. The underlay transport mechanism may be selected based on current measured performance and characteristics defined by the SD-WAN policy.

The system may integrate the configured PDU Sessions and QoS flows with the configuration of the endpoint policies for routing traffic across the WAN VPNs. In some implementations, this may be achieved by combining the policy configuration of the specific network slice with its associated PDU Session and QoS Flow characteristics, and the policy configuration of the endpoint with its associated VPNs. This may be accomplished through QoS and policy mapping, at least in part by linking the QoS flow configuration with the VPN configuration.

Referring now to the drawings, FIG. 1 is an illustrative diagram of a software-defined wide area network (SD-WAN) 100 (e.g. an enterprise SD-WAN) involving one or more communication networks 102 and a plurality of endpoints (or tunnel router endpoints) 110. In FIG. 1, the plurality of endpoints 110 include endpoints 112, 114, 116, and 118. Each tunnel router endpoint may be configured to process communications for hosts according to a network overlay protocol in concert with other endpoints to facilitate a plurality of network overlays comprising virtual private networks (VPNs) to define the SD-WAN fabric. Each one of the endpoints 110 may be associated with different services or functions. For example, endpoint 114 may be associated with an enterprise data center 120, endpoint 116 may be associated with a cloud provider 122, and endpoint 118 may be associated with an internet firewall and peering service 124.

Many or most forms of overlay networking use some sort of encapsulation or encoding that marks the data before it is sent to its destination. When the data reaches its destination, the encapsulated message is unwrapped and delivered to its final intended destination (e.g. an application). Overlay networking may include peer-to-peer networks, IP networks, and virtual local area networks (VLANs). Some protocols developed for overlay networking include IP, virtual extensible LAN (VXLAN, RFC 7348), VPNs, and IP multicast. The advent of SDN has spawned even more overlay technologies.

An SD-WAN controller 150 of FIG. 1 may provide physical or virtual device management for endpoints and gateways associated with the controller. For example, SD-WAN controller 150 may be configured for configuration and activation, IP address management, and/or pushing down policies onto endpoints and gateways. SD-WAN controller 150 may maintain connections to endpoints and gateways to identify operational states of SD-WAN tunnels across one or more WANs and retrieve QoS performance metrics associated with each SD-WAN tunnel.

Figure 2A:
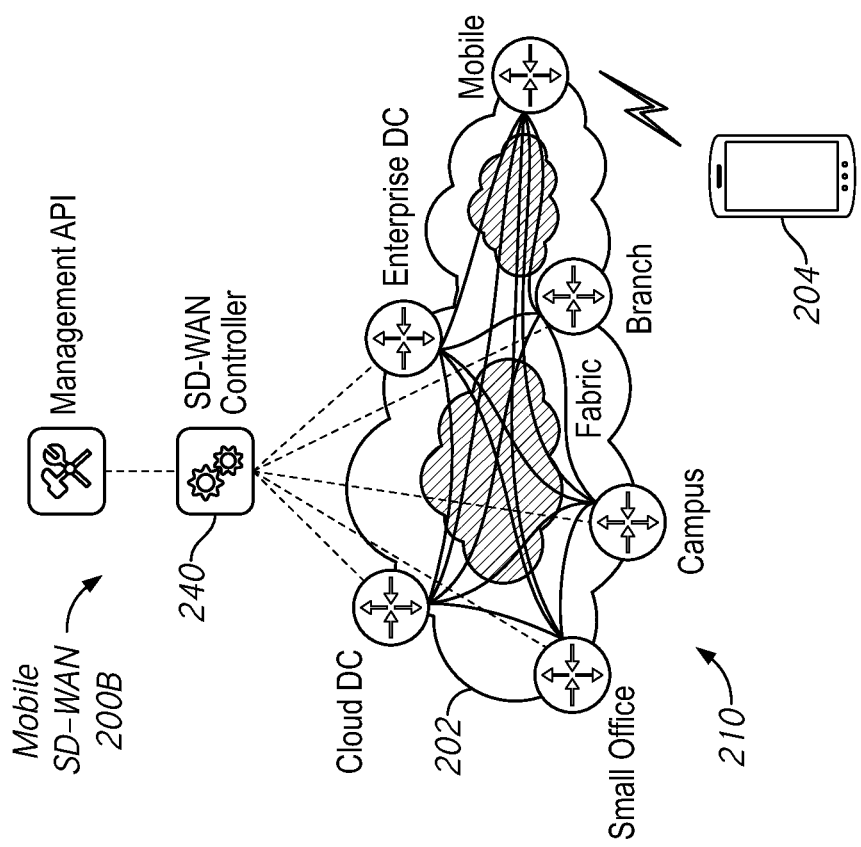
FIG. 2A is an illustrative representation of an example enterprise SD-WAN without accommodation of mobile devices.
Figure 2B:
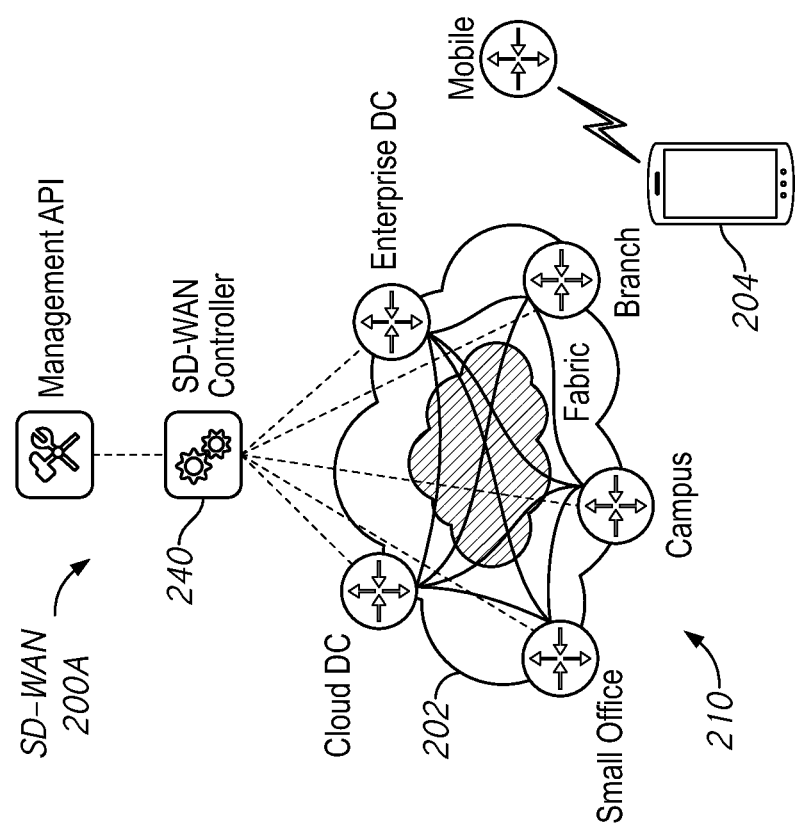
FIG. 2B is an illustrative representation of an example enterprise SD-WAN with accommodation for mobile devices, having a fabric extension for mobility.

FIG. 2A is an illustrative representation of an example SD-WAN 200A having a plurality of endpoints 210 connected in one or more communication networks 202 in an SD-WAN fabric without accommodation of mobile devices ("Mobile") (e.g. UE 204); that is, mobile devices are "off-fabric" in accordance with traditional configurations. In contrast, FIG. 2B is an illustrative representation of an example SD-WAN 200B having the plurality of endpoints 210 connected in the one or more communication networks 202 in the SD-WAN fabric with fabric extension for mobile devices ("Mobile") (e.g. UE 204) in accordance with some implementations of the present disclosure.

Figure 3A:
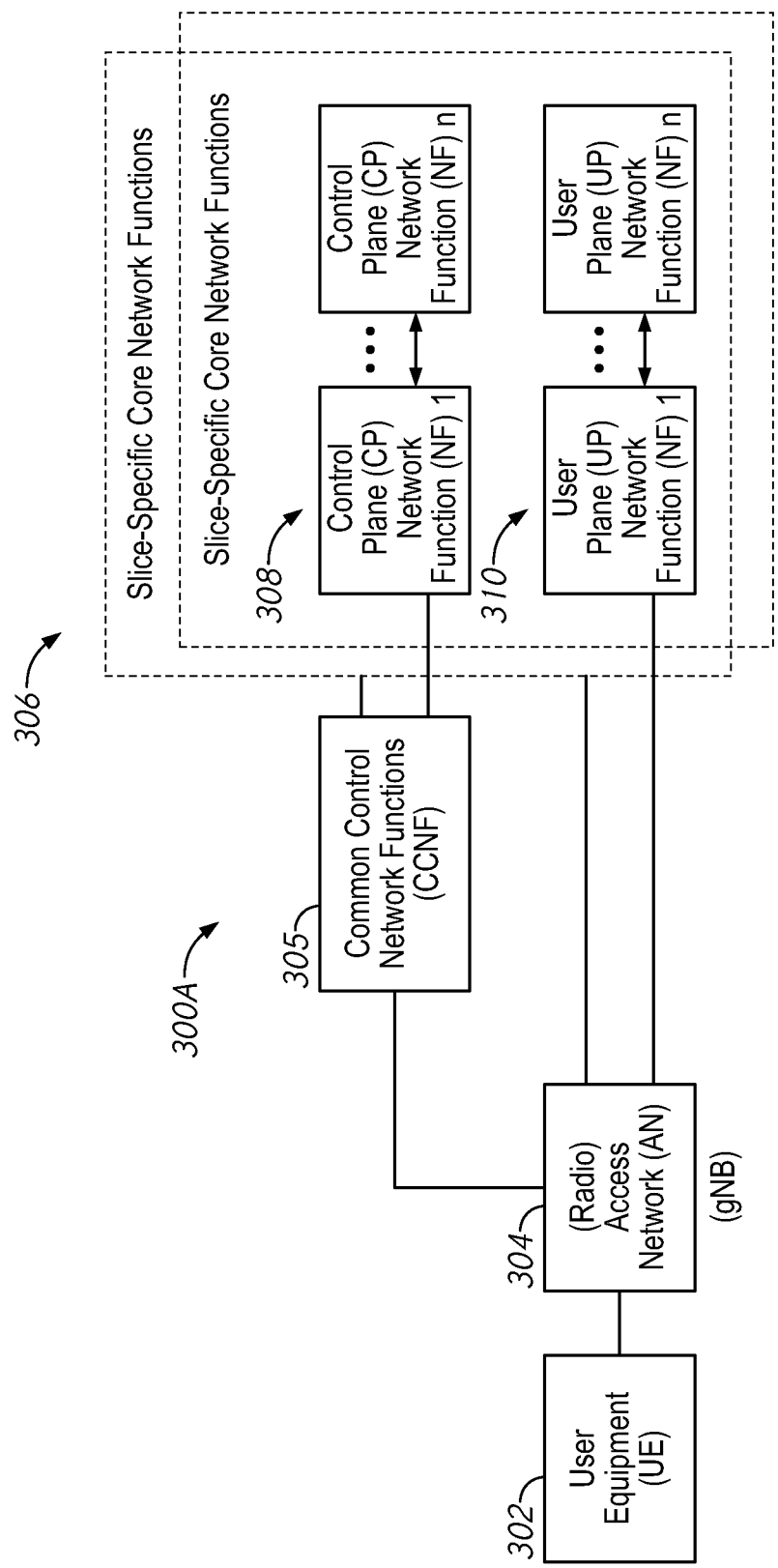
FIG. 3A is an illustrative representation of a basic network architecture of a Fifth Generation (5G) mobile network.

Regarding the mobile network, FIG. 3A is an illustrative representation of a network architecture 300A of a 5G mobile network configured to facilitate communications for user equipment (UE) 302. In general, network architecture 300A includes common control network functions (CCNF) 305 and a plurality of slice-specific core network functions 306. UE 302 may obtain access to the mobile network via an access network (AN) 304, which may be a radio access network (RAN). In the present disclosure, UE 302 operating in the 5G mobile network may be any suitable type of devices, such as cellular telephones, smart phones, tablet devices, Internet of Things (IoT) devices, and machine-to-machine (M2M) communication devices, to name but a few.

CCNF 305 includes a plurality of network functions (NFs) which commonly support all sessions for UE 302. UE 302 may be connected to and served by a single CCNF 305 at a time, although multiple sessions of UE 302 may be served by different slice-specific core network functions 306. CCNF 305 may include, for example, an access and mobility management function (AMF) and a network slice selection function (NSSF). UE-level mobility management, authentication, and network slice instance selection are examples of common functionalities provided by CCNF 305.

Slice-specific core network functions of network slices 306 are separated into control plane (CP) NFs 308 and user plane (UP) NFs 310. In general, the user plane carries user traffic while the control plane carries network signaling. CP NFs 308 are shown in FIG. 3A as CP NF 1 through CP NF n, and UP NFs 310 are shown in FIG. 3A as UP NF 1 through UP NF n. CP NFs 308 may include, for example, a session management function (SMF), whereas UP NFs 310 may include, for example, a user plane function (UPF).

Figure 3B:
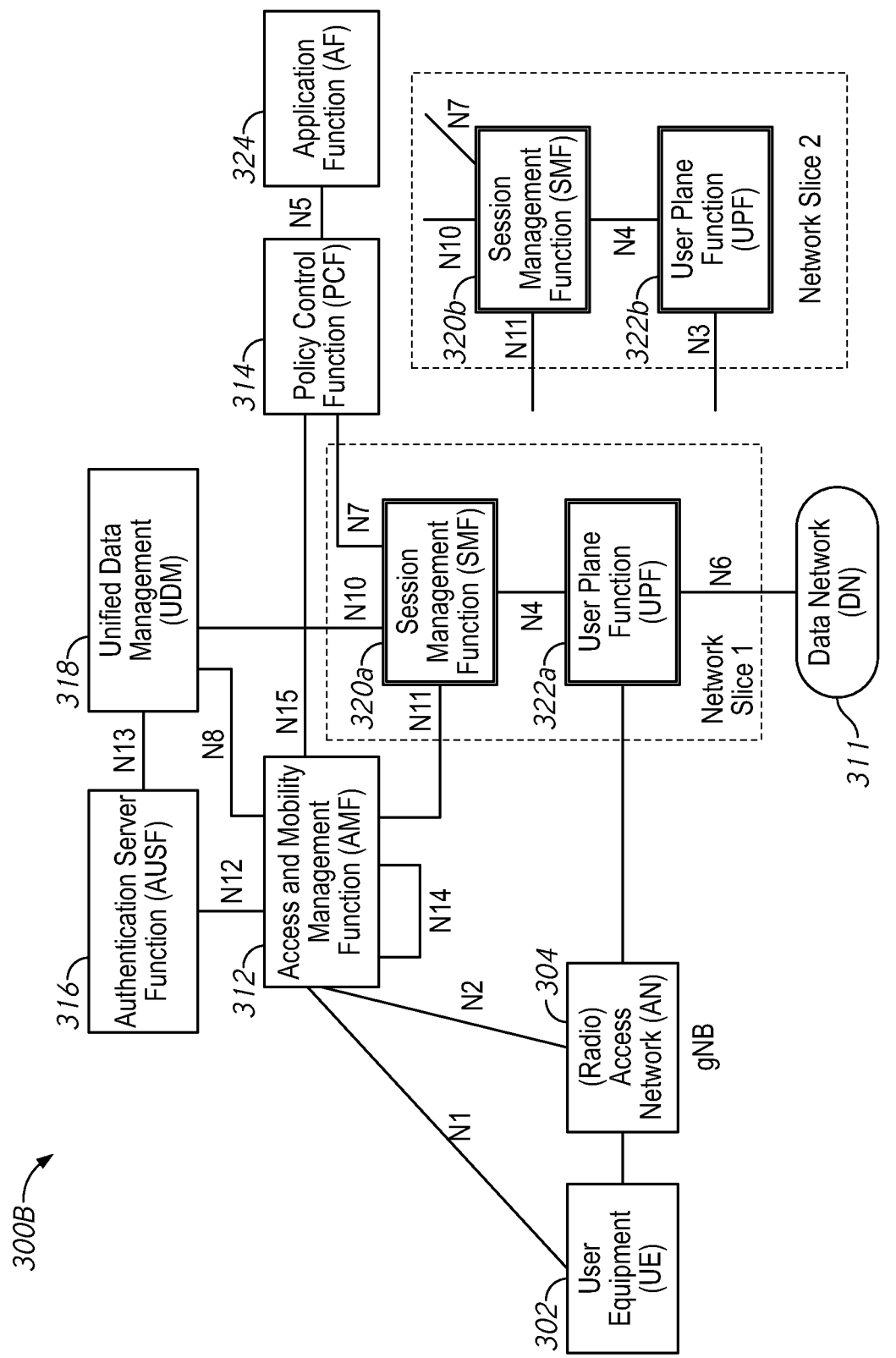
FIG. 3B is an illustrative representation of a more detailed network architecture of the mobile network of FIG. 3A.

FIG. 3B is an illustrative representation of a more detailed network architecture 300B of the 5G mobile network of FIG. 3A. As provided in 3GPP standards for 5G (e.g. 3GPP 23.501 and 23.502), network architecture 300B for the 5G mobile network may include an authentication server function (AUSF) 316, a unified data management (UDM) 318 (having a unified data repository or UDR), an AMF 312, a policy control function (PCF) 314, an SMF 320a, and a UPF 322a. A plurality of interfaces or reference points N1 through N15 shown in FIG. 3B may define the communications and/or protocols between each of the entities, as described in the relevant (evolving) standards documents.

One or more application functions, such as an application function (AF) 324, may connect to the 5G mobile network via PCF 314. A UPF, such as UPF 322a, may provide connection to a data network (DN) 311 for communications with application servers and other entities.

UPF 322a is part of the user plane and all other NFs (i.e. AMF 312, SMF 320a, PCF 314, AUSF 316, and UDM 318) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling. As specifically illustrated in FIG. 3B, NFs such as SMF 320a and UPF 322a of FIG. 3B may be provided as specific instances in a first network slice (e.g. network slice 1). Additional instances of NFs for additional network slices may be provided as well, as illustrated by SMF 320b and UPF 322b provided as additional specific instances in a second network slice (e.g. network slice 2).

Figure 3C:
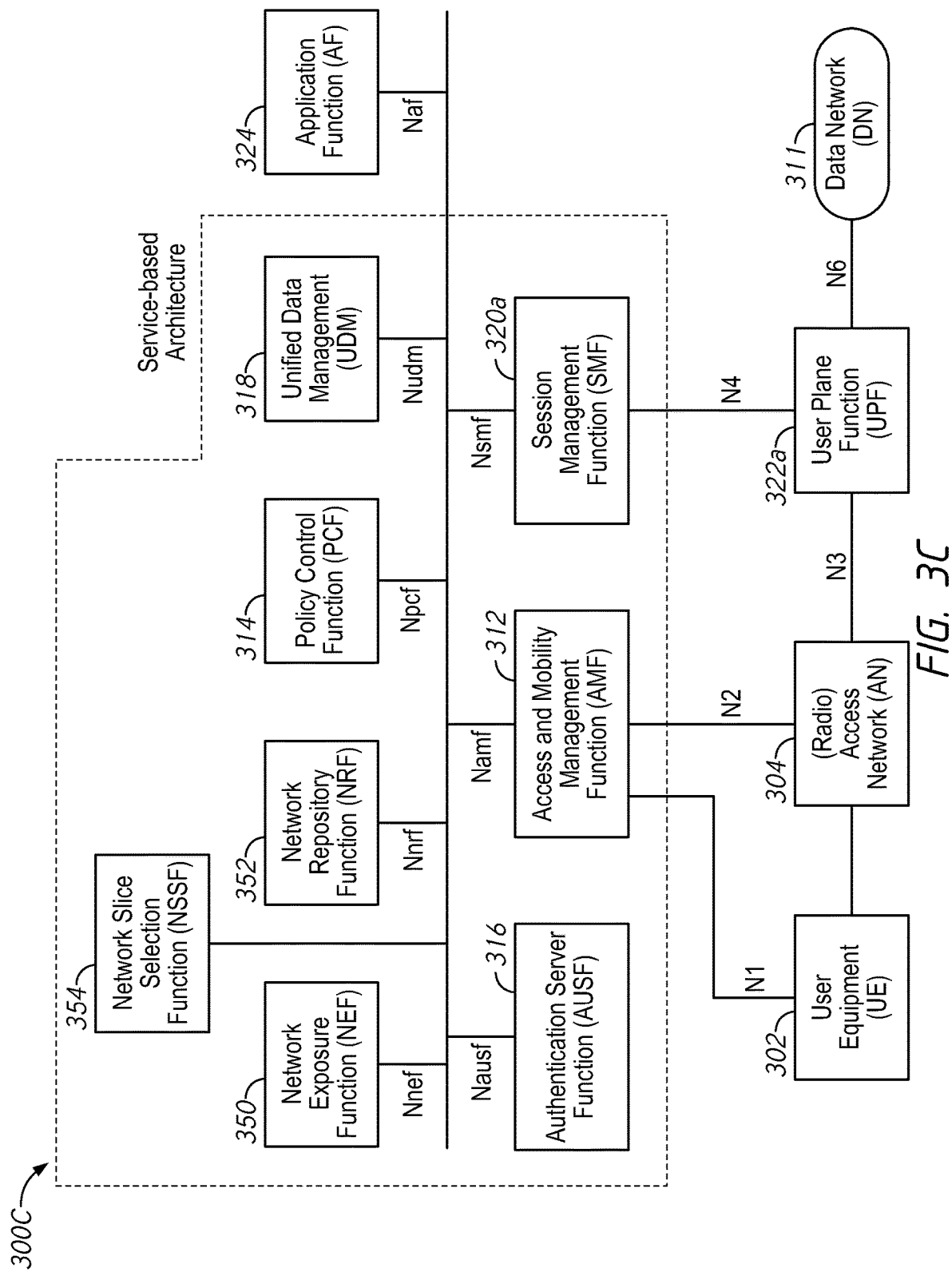
FIG. 3C is an illustrative representation of the mobile network of FIGS. 3A-3B as a service-based architecture.

In FIG. 3C, a service-based architecture 300C of the 5G mobile network of FIGS. 3A-3B is illustrated. Network node functions in the service-based architecture 300C of FIG. 3C, not shown in FIGS. 3A-3B, include a network exposure function (NEF) entity 350, an NF repository function (NRF) 352, and network slice selection function (NSSF) 354. A plurality of interfaces N1 through N6, as well as interfaces $N_{nef}$, $N_{nrf}$, $N_{nssf}$, $N_{pcf}$, $N_{udm}$, $N_{ausf}$, $N_{amf}$, $N_{smf}$, and $N_{af}$, may define the communications and/or protocols between each of the entities, as described in the relevant (evolving) standards.

Figure 3D:
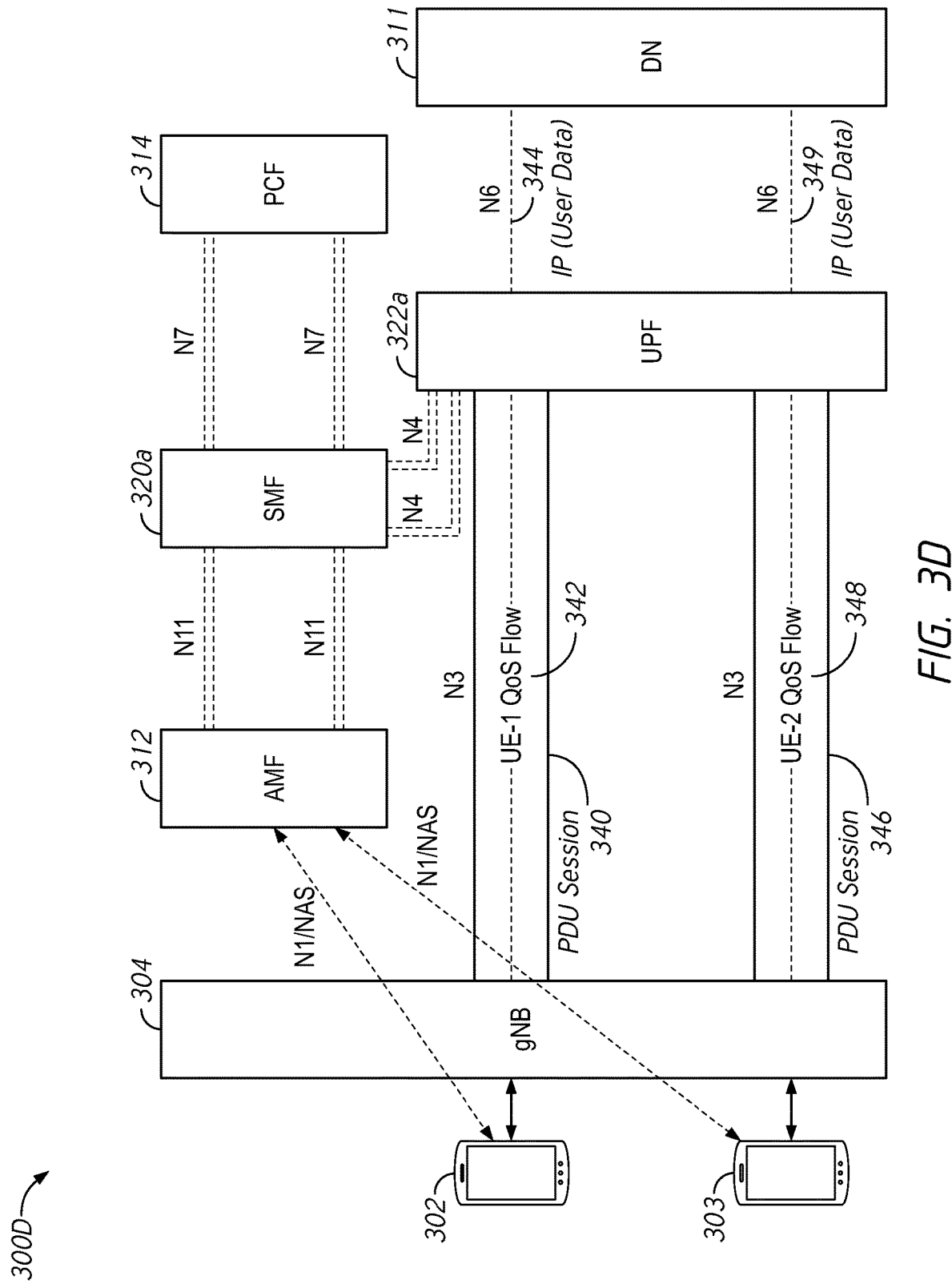
FIG. 3D is a different schematic representation of a network architecture of the mobile network of FIGS. 3A-3C, further illustrating signaling and packet flows involving two user equipments (UEs) in the mobile network.

FIG. 3D is a different schematic representation of a network architecture 300D of the mobile network of FIGS. 3A-3C. More specifically, FIG. 3D illustrates signaling and packet flows involving two UEs 302 and 303 in the mobile network. The RAN or gNB 304 may interface with UPF 322a using the N3 interface, and the UPF 322a may interface with DN 311 using the N6 interface. Data packets for an application of UE 302 are communicated between gNB 304 and UPF 322a using the N3 interface in a QoS flow 342 of a PDU session 340; on the other hand, data packets are communicated between the UPF 322a and the DN 311 using the N6 interface using the framing protocol for the application (i.e. the PDU Session Type) which may be IPv4, IPv6, Ethernet, or Unstructured. Similarly, data packets for an application of UE 303 are communicated between gNB 304 and UPF 322a using the N3 interface in a QoS flow 348 of a PDU session 346; these same data packets are communicated between the UPF 322a and the DN 311 using the N6 interface and the framing protocol for the application (i.e. the PDU Session Type).

More and more, business is conducted using mobile devices. Thus, mobile devices are important extensions to enterprise WANs. However, traditional SD-WAN does not extend into cellular networks. See again e.g. FIG. 2A.

According to some implementations of the present disclosure, 5G network slicing and segmentation may be used to accommodate such needs. An enterprise SD-WAN fabric may be extended into a cellular network, and a system or controller may be used to configure such interconnected network. Here, network slices (e.g. including UPF instances) may be created and managed as pieces of network infrastructure, supporting specific enterprise SD-WAN requirements if and as needed. Communications for the mobile devices in the cellular network may be facilitated across the SD-WAN fabric based on policy mappings between SD- WAN policies associated with different VPNs of the SD-WAN fabric and different QoS flows via the UPF instance.

Figure 4A:
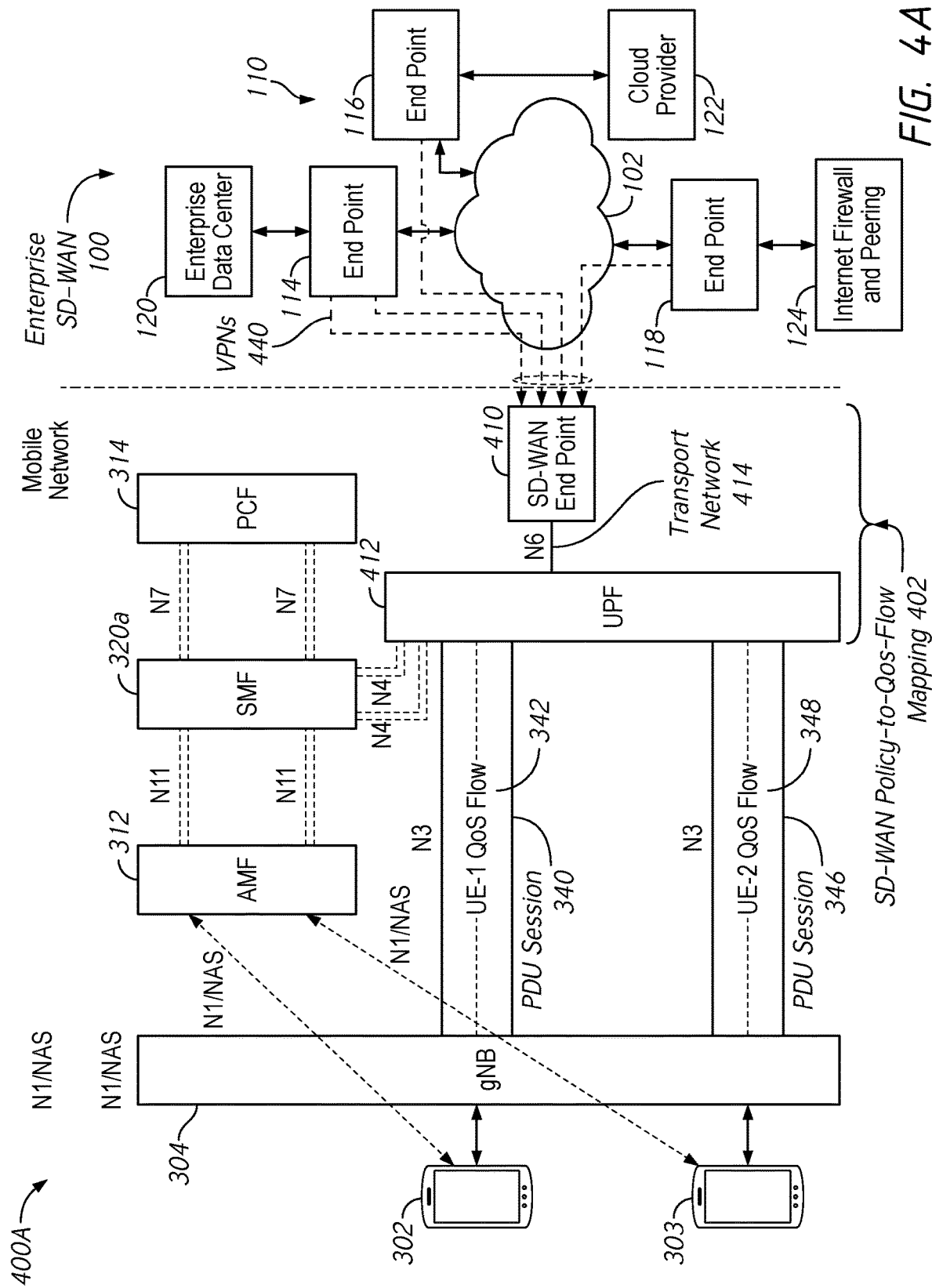
FIGS. 4A-4B are illustrative representations of systems which interconnect SD-WAN fabrics with mobile networks for communication with UEs with use of policy mappings according to at least some implementations of the present disclosure.

To better illustrate, FIG. 4A is an illustrative representation of a system 400A which interconnects an SD-WAN fabric with a mobile network for communication with UEs with use of policy data mappings, according to at least some implementations of the present disclosure.

In the example of FIG. 4A, system 400A may include SD-WAN 100 of FIG. 1 which is interconnected with the 5G mobile network of FIGS. 3A-3D. Here, an endpoint 410 is provided (e.g. in the mobile network) and connected with a UPF 412. Endpoint 410 may be a tunnel router endpoint for an SD-WAN ("SD-WAN endpoint"), configured to process communications for hosts according to a network overlay protocol in concert with other endpoints to facilitate a plurality of network overlays comprising VPNs 440 to define the SD-WAN fabric. Each one of at least some VPNs 440 may be associated with one of a plurality of different SD-WAN policies. UPF 412 may be a UPF instance which is part of a network slice instance (uniquely) associated with an enterprise of the SD-WAN 100. In FIG. 4A, endpoint 410 and UPF 412 may communicate using the N6 interface; in some implementations, a (e.g. local) transport network 414 may be provided therebetween over this interface.

Figure 4B:
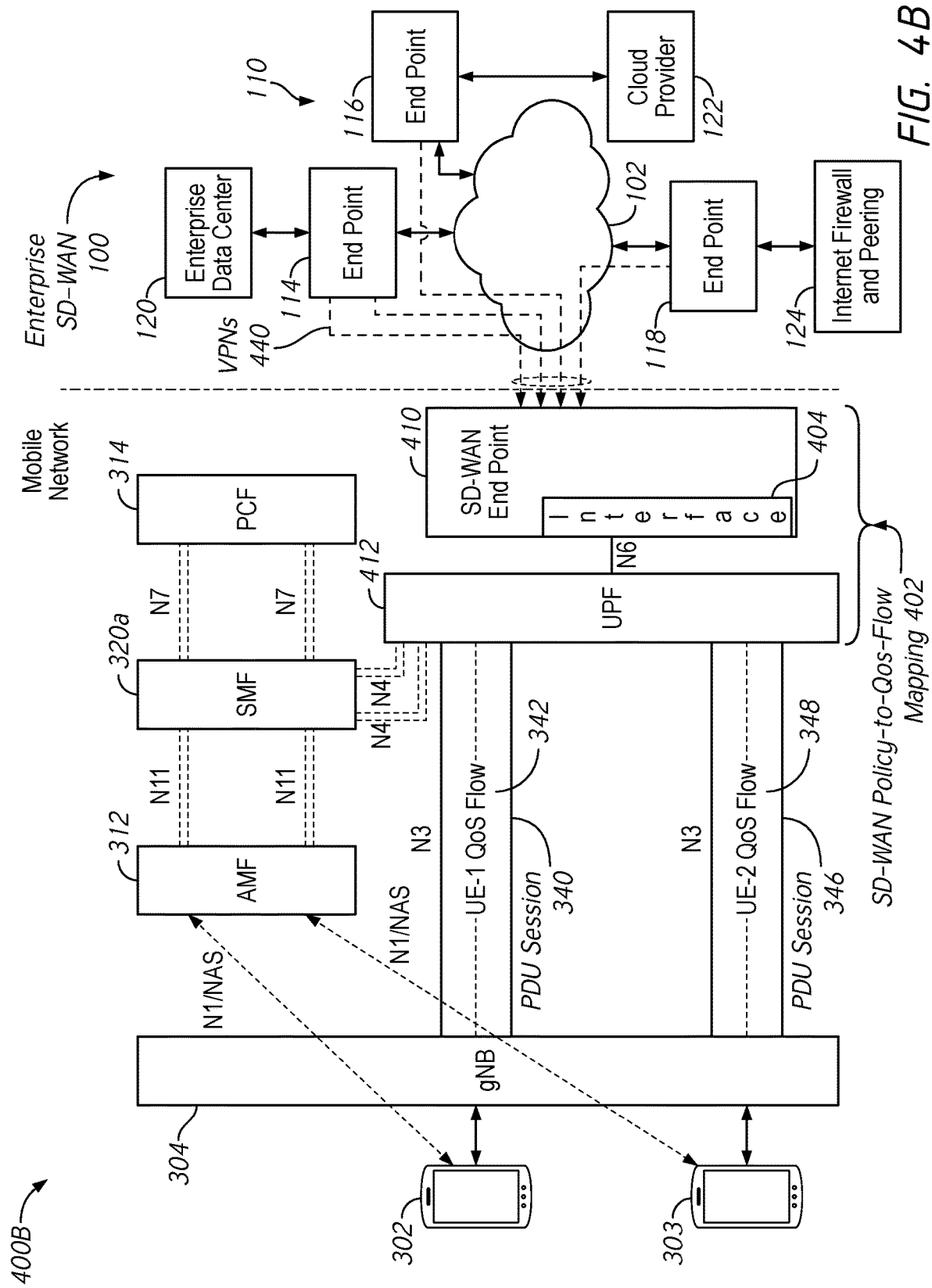

As indicated in FIG. 4A, an SD-WAN policy-to-QoS flow mapping 402 may be provided for appropriately interconnecting these networks. Mapping 402 may associate SD-WAN policies (e.g. VPNs) at endpoint 410 with matching or substantially matching QoS flows at UPF 412, for policy rules/configuration selection. At least some policy data mapping may be maintained at a policy server (e.g. PCF 314 of FIGS. 14A-14B). Communications for UEs in the mobile network (e.g. UEs 302 and 3030) may therefore be appropriately facilitated across the SD-WAN fabric in SD-WAN 100 with use of policy mappings. As shown in FIG. 4B, endpoint 410 may include an interface or interface function 404 which includes the mapping or mapping data. In some implementations, UPF 412 may have a similarly configured interface.

Figure 5B:
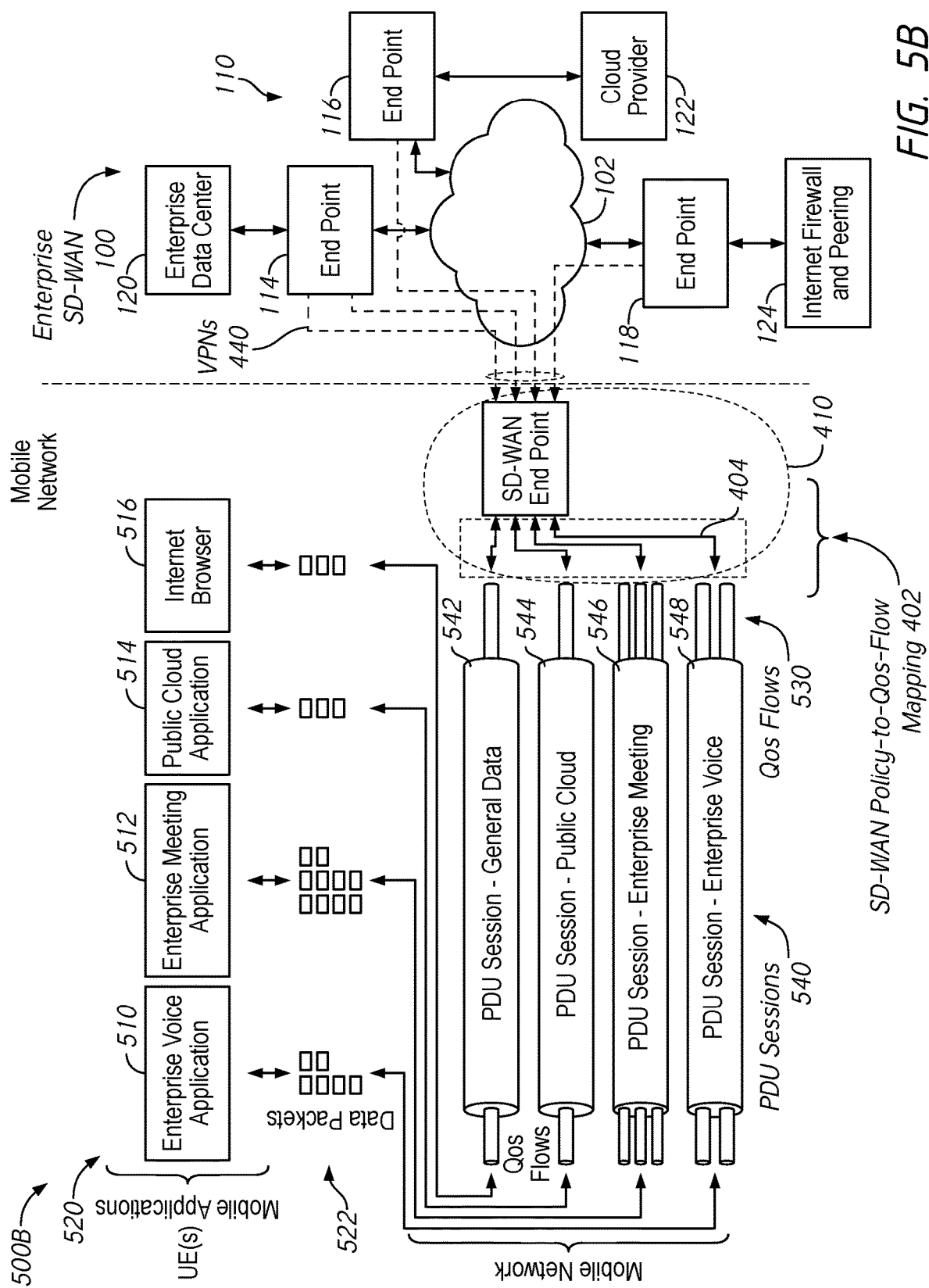

FIGS. 5A-5B are illustrative representations of systems 500A and 500B, respectively, which interconnect SD-WAN fabrics with mobile networks for communication with UEs with use of policy mappings according to at least some implementations of the present disclosure. The illustrations of systems 500A and 500B are the same as or similar to the illustrations of the systems 400A and 400B of FIGS. 4A and 4B, but with further illustrative detail regarding UE (mobile) applications, PDU sessions, and QoS flows in a specific illustrative example.

A plurality of mobile applications 520 may be provided at UEs. In FIG. 5A, applications 520 include an application 510 for voice (e.g. an enterprise voice application), an application 512 for a meeting service (e.g. an enterprise meeting application), an application 514 for public cloud-hosted tools (e.g. MS Office 365), and an application 516 for Internet browser. As illustrated, data packets 522 associated with these applications 520 are communicated via the mobile network. Communication of these data packets 522 may be facilitated in a plurality of established PDU sessions 540, each of which may include one or more QoS flows 530.

In the specific example, data packets associated with application 510 (e.g. voice service) are communicated in a PDU session 548 configured for enterprise voice with 2 QoS flows for signaling and data, respectively. Policy mapping 402 associates or links these QoS flows with a selected SD-WAN policy which indicates use of a selected VPN associated with endpoint 114 to the enterprise data center 120 for low latency, low bandwidth.

Data packets associated with application 512 (e.g. meeting service) are communicated in a PDU session 546 configured for enterprise meeting with 3 QoS flows for signaling, data, and video, respectively. Policy mapping 402 associates or links these QoS flows with a selected SD-WAN policy which indicates use of a selected VPN associated with endpoint 114 to the enterprise data center 120 for assured bandwidth.

Data packets associated with application 514 (e.g. public cloud-hosted tools) are communicated in a PDU session 544 configured for public cloud with 1 QoS flow for the data. Policy mapping 402 associates or links this QoS flow with a selected SD-WAN policy which indicates use of a selected VPN associated with endpoint 116 for public cloud platform 122.

Finally, data packets associated with application 516 (e.g. Internet browser) are communicated in a PDU session 542 configured for general (e.g. Internet) data with 1 QoS flow for the data. Policy mapping 402 associates or links this QoS flow with a selected SD-WAN policy which indicates use of a selected VPN associated with endpoint 118 for Internet firewall and peering location server 124.

Figure 5C:
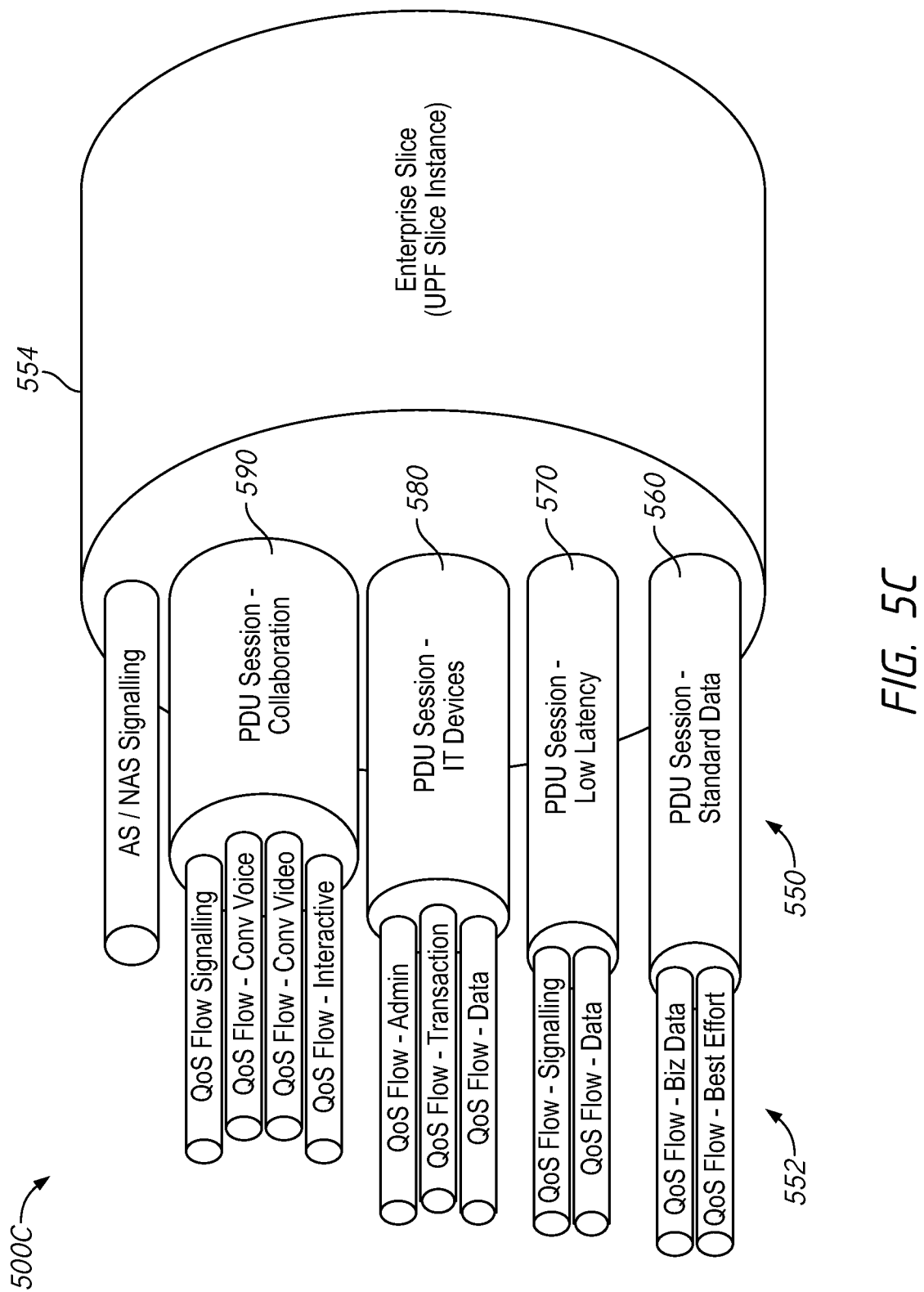
FIG. 5C is an illustrative representation of specific examples of various PDU sessions and associated QoS flows which may be utilized in the systems of FIGS. 5A-5B.

FIG. 5C is an illustrative representation of specific examples 500C of various PDU sessions 550 and associated QoS flows 552 of an enterprise slice 554 which may be utilized in the systems of FIGS. 5A-5B. The enterprise slice 554 may be associated with a (single) enterprise and enterprise SD-WAN. In the example of FIG. 5C, what is shown is a PDU session 560 with QoS flows for standard data (e.g. business data, best effort), a PDU session 570 with QoS flows for low latency (e.g. signaling, data), a PDU session 580 with QoS flows for IT devices (e.g. administrative, transactions, data), and a PDU session 590 with QoS flows for collaboration (e.g. signaling, conv. voice, conv. video, interactive).

Note that QoS flows of PDU sessions may be driven by end service and service application function requirements. PDU sessions may be used when separate network anchor points may be required. Enterprise granularity of QoS management and traffic segmentation may be exposed for enterprise control. The unique network slice for a given enterprise customer may be provided for complete control over QoS flows, network anchor points, and/or traffic characteristics.

The methods of FIGS. 6A-6B and 7A-7B which will now be discussed may be implemented in relation to the systems, nodes, and/or interfaces shown and described in relation to FIGS. 4A-4B and 5A-5C.

FIG. 6A is a flowchart 600A for describing a method for use in interconnecting an SD-WAN fabric with a mobile network with use of policy mappings according to some implementations of the present disclosure. At least part of the method may be embodied as a computer program product including a non-transitory computer readable medium (e.g. memory, card, or disk, etc.) and instructions stored in the computer readable medium, where the instructions are executable on one or more processors of the node for performing the steps of the method.

Beginning at a start block 602 of FIG. 6A, an interface between a UPF instance of a mobile network and a tunnel router endpoint of an SD-WAN is provided (step 604 of FIG. 6A). The UPF instance may be part of a network slice instance (uniquely) associated with an enterprise of the SD-WAN; the subscriber associated with the UE may be a member of the enterprise. The tunnel router endpoint may be configured to process communications for hosts according to a network overlay protocol in concert with other tunnel router endpoints to facilitate a plurality of network overlays comprising VPNs of the enterprise SD-WAN fabric. A plurality of mappings between policies associated with different QoS flows via the UPF instance and SD-WAN policies associated with different VPNs of the SD-WAN fabric may be determined and/or maintained (step 606 of FIG. 6A). Each one of at least some of the VPNs may be associated with a different underlying transport mechanism that satisfies characteristics of a specific SD-WAN policy. The mappings may associate SD-WAN policies (e.g. VPNs) at the tunnel router endpoint with matching or substantially matching QoS flows at the UPF instance. Communications for UEs in the mobile network may be facilitated across the SD-WAN fabric with use of the policy mappings (step 608 of FIG. 6A).

Again, each VPN may be associated with a different underlying transport mechanism that satisfies characteristics of a specific SD-WAN policy. As an illustrative example, the SD-WAN policies may include a first SD-WAN policy associated with a first VPN for low latency communications and a second SD-WAN policy associated with a second VPN for high bandwidth communications.

In some implementations of the present disclosure, the mappings may be dynamically updated in response to updates or changes to the policies (e.g. SD-WAN policies). This is shown in a flowchart 600B of FIG. 6B, which is generally the same as flowchart 600A of FIG. 6A, but where the determining (step 606) and facilitating (step 608) may be repeated for each update, change, or addition to one or more policies.

Figure 7A:
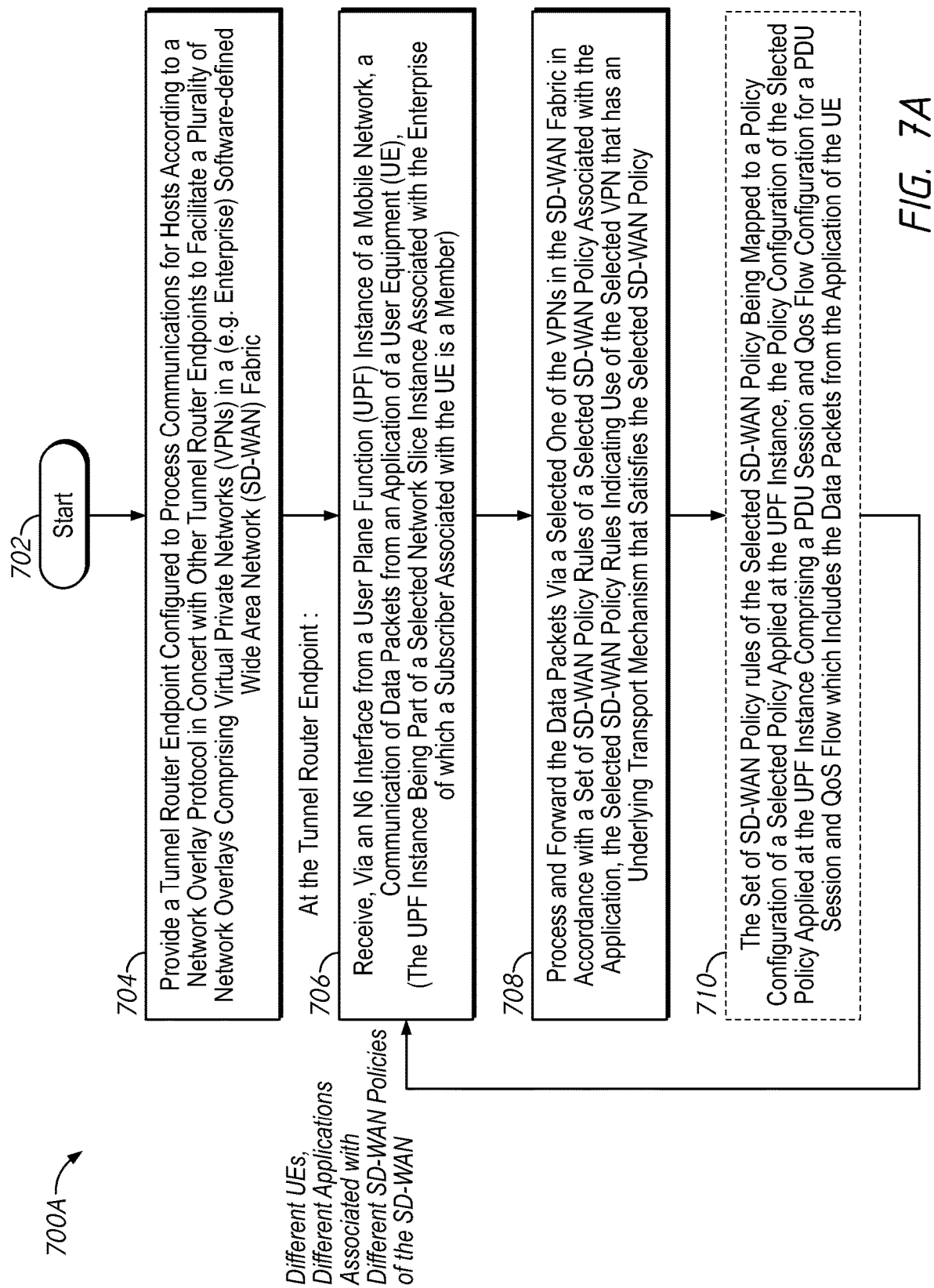
FIG. 7A is a flowchart for describing a method of a tunnel router endpoint (or SD-WAN endpoint) for use in interconnecting an SD-WAN fabric with mobile networks with use of policy mappings according to some implementations of the present disclosure.

FIG. 7A is a flowchart 700A for describing a method for use in interconnecting an SD-WAN fabric with a mobile network with use of policy mappings. The method may be performed at a router node, such as a tunnel router endpoint or SD-WAN endpoint. The node may include one or more processors, one or more memories coupled to the one or more processors, and/or one or more interfaces. At least part of the method may be embodied as a computer program product including a non-transitory computer readable medium (e.g. memory, card, or disk, etc.) and instructions stored in the computer readable medium, where the instructions are executable on one or more processors of the node for performing the steps of the method.

Beginning at a start block 702 of FIG. 7A, a tunnel router endpoint may be provided in a mobile network (step 704 of FIG. 7A). The tunnel router endpoint may be configured to process (e.g. on the WAN side) communications for hosts according to a network overlay protocol in concert with other tunnel router endpoints to facilitate a plurality of network overlays comprising VPNs of a SD-WAN fabric (e.g. an enterprise SD-WAN fabric). Each VPN may be associated with one of a plurality of different SD-WAN policies, where each SD-WAN policy is associated with one of a plurality of different applications. The tunnel router endpoint may receive, via an N6 interface from a UPF instance of a mobile network, a communication of data packets from an application of a UE (step 706 of FIG. 7A). The UPF instance may be part of a selected network slice instance (uniquely) associated with an enterprise of the SD-WAN; the subscriber associated with the UE may be a member of the enterprise. The tunnel router endpoint may process and forward the data packets via a selected one of the VPNs in the SD-WAN fabric in accordance with a set of SD-WAN policy rules of a selected SD-WAN policy associated with the application (step 708 of FIG. 7A). The selected SD-WAN policy rules may indicate use of the selected VPN having an underlying transport mechanism that satisfies the selected SD-WAN policy. The set of SD-WAN policy rules of the selected SD-WAN policy may be mapped to a policy configuration of a selected policy applied at the UPF (information box 710 of FIG. 7A). The policy configuration of the selected policy applied at the UPF may be or include a PDU session and QoS flow configuration for a PDU session and QoS flow of the data packets from the application of the UE. The set of SD-WAN policy rules of the selected SD-WAN policy may be provisioned by a policy server of the mobile network. Note that, although steps 706 and 708 describe communications in a single direction from the mobile network to SD-WAN, communications may also be facilitated and processed in the reverse direction from SD-WAN to mobile network in the reverse manner.

In the technique of FIG. 7A, the tunnel endpoint router may receive communications from the UPF instance via a transport network between the UPF instance and the tunnel endpoint router (the N6 interface). In some implementations, the tunnel endpoint router may receive the communication of data packets from the application of the UE by receiving the communication of data packets via one of a plurality of virtual local area networks (VLANs) with use of a VLAN ID associated with the VLAN, where the VLAN ID being included in the set of SD-WAN policy rules of the selected SD-WAN policy. Alternatively, the tunnel endpoint router may receive the communication of data packets from the application of the UE by receiving the communication of data packets via one of a plurality of generic routing encapsulation (GRE) tunnels with use of a GRE tunnel ID associated with the GRE tunnel, the GRE tunnel ID being included in the set of SD-WAN policy rules of the selected SD-WAN policy.

Figure 7B:
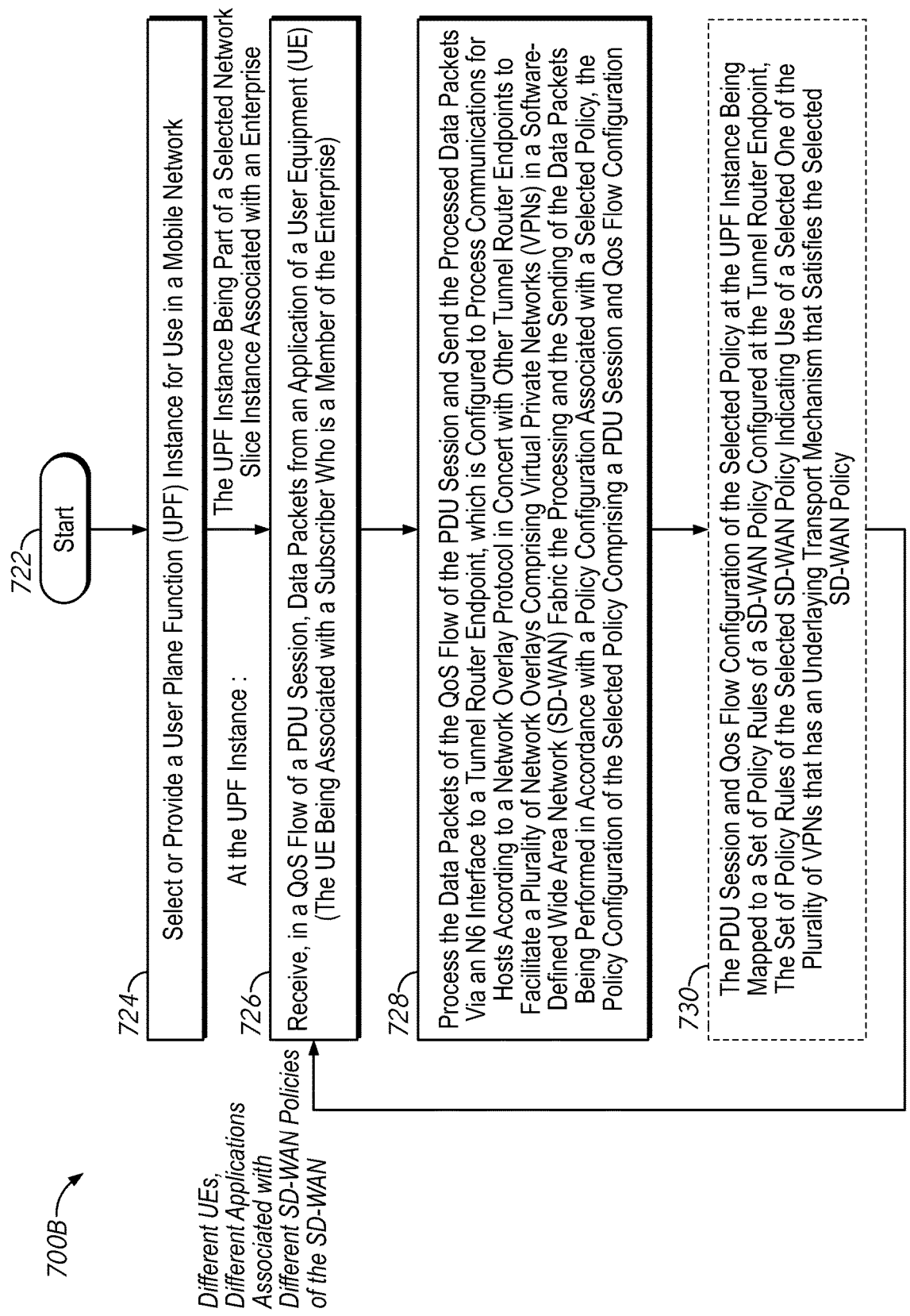
FIG. 7B is a flowchart for describing a method of a user plane (UP) entity (e.g. a UPF) for use in interconnecting an SD-WAN fabric with mobile networks with use of policy mappings according to some implementations of the present disclosure.

FIG. 7B is a flowchart 700B for describing a method for use in interconnecting an SD-WAN fabric with a mobile network with use of policy mappings. The method may be performed at a user plane (UP) entity, such as a UPF or network element or node associated therewith. The node may include one or more processors, one or more memories coupled to the one or more processors, and/or one or more interfaces. At least part of the method may be embodied as a computer program product including a non-transitory computer readable medium (e.g. memory, card, or disk, etc.) and instructions stored in the computer readable medium, where the instructions are executable on one or more processors of the node for performing the steps of the method.

Beginning at a start block 722 of FIG. 7B, a UPF instance may be selected or provided for use in a mobile network (step 724 of FIG. 7B). The UPF instance may be part of a selected network slice instance (uniquely) associated with an enterprise of the SD-WAN; the subscriber associated with the UE may be a member of the enterprise. The UPF instance may interface with a tunnel router endpoint over an N6 interface of the mobile network. The tunnel router endpoint may be configured to process communications for hosts according to a network overlay protocol in concert with other tunnel router endpoints to facilitate a plurality of network overlays comprising VPNs of a (e.g. enterprise) SD-WAN fabric. Each VPN may be associated with one of a plurality of different SD-WAN polices, where each SD-WAN policy is associated with one of a plurality of different applications. The UPF instance may receive, in a QoS flow of a PDU session, data packets from an application of a UE (step 726 of FIG. 7B), process the data packets of the QoS flow of the PDU session (step 728 of FIG. 7B), and send the processed data packets via the N6 interface to the tunnel router endpoint (again step 728 of FIG. 7B). The processing and sending in step 728 may be performed in accordance with a policy configuration associated with a selected policy, where the policy configuration is a PDU session and QoS flow configuration at the UPF instance. The PDU session and QoS flow configuration of the selected policy may be mapped to a set of SD-WAN policy rules of a selected SD-WAN policy configured at the tunnel router endpoint (information box 730 of FIG. 7B). Here, the set of SD-WAN policy rules indicate use of a selected one of the plurality of VPNs having an underlaying transport mechanism that satisfies the selected SD-WAN policy. The policy configuration may be provisioned at the UPF instance by at least one of a policy server (e.g. PCF) and an SMF of the mobile network. Note that, although steps 726 and 728 describe communications in a single direction from the mobile network to SD-WAN, communications may also be facilitated and processed in the reverse direction from SD-WAN to mobile network in the reverse manner.

Figures 9, 10:
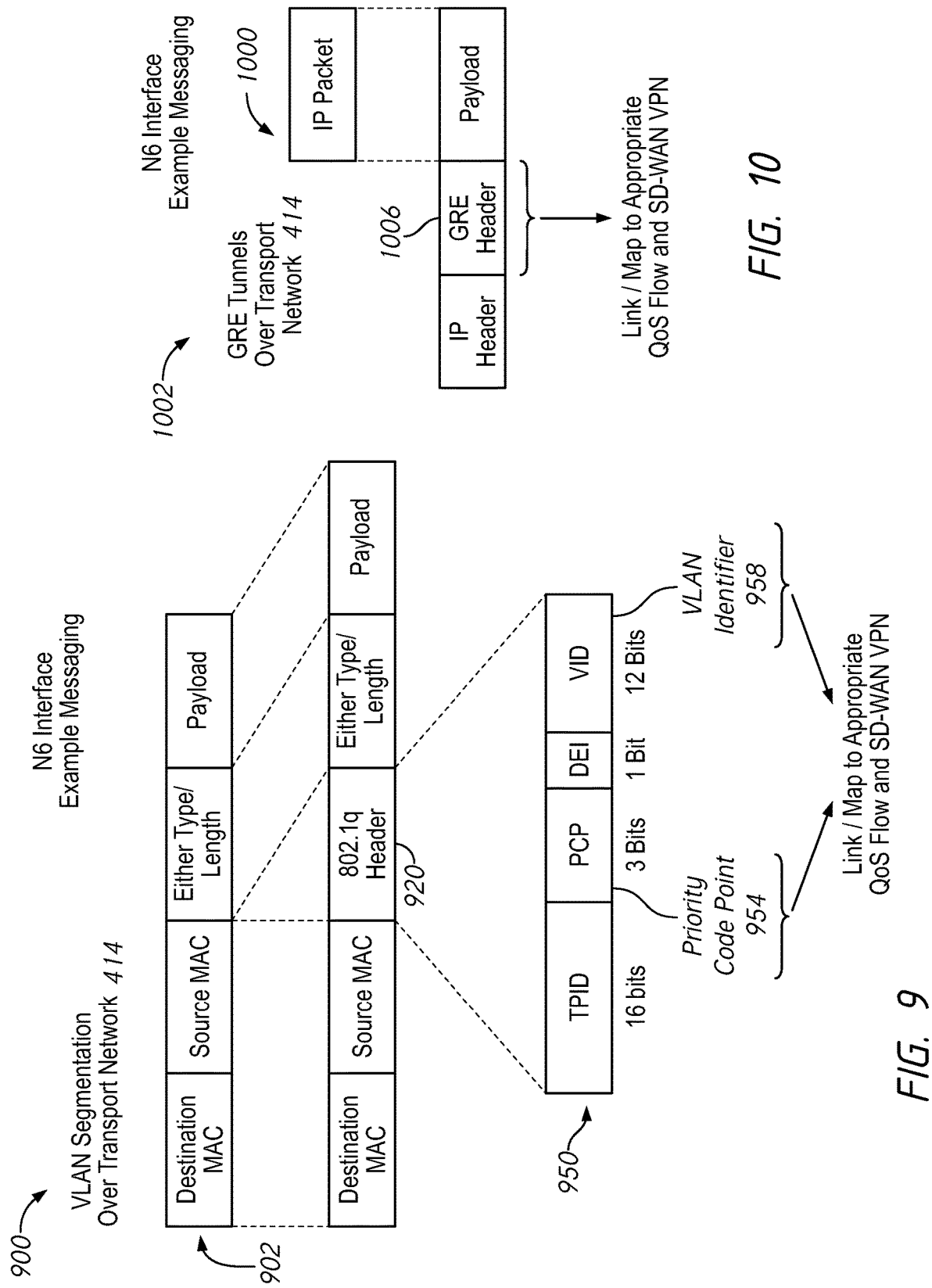
FIG. 9 is an illustration of a message formatting of a message associated with virtual local area network (VLAN) segmentation in a transport network along the N6 interface according to some implementations.
FIG. 10 is an illustration of a message formatting of a message associated with generic routing encapsulation (GRE) tunneling along the N6 interface according to some implementations.

Again, in some implementations of the techniques described herein, such as the techniques of FIGS. 6A-6B and 7A-7B, the policy mappings may be associated with a linking of an identifier of a VLAN or a GRE tunnel over a transport network provided between the UPF instance and the tunnel router endpoint. In FIG. 9, what is shown is a message formatting 900 of a message 902 associated with VLAN segmentation; here, an 802.1q header 920 in message 902 may include a message portion 950 which includes a priority code point 954 and a VLAN ID (VID) 958. In FIG. 10, what is shown is a message formatting 1000 of a message 1002 associated with GRE tunneling; here, a GRE header 1006 may be provided in the message 1002. Accordingly, such identifiers (e.g. VID 958 and/or PCP 954 of FIG. 9, or GRE header 1006 of FIG. 10) may be utilized at the tunnel router endpoint and UPF instance for an appropriate linking or mapping between QoS flow and SD-WAN policy or VPN (or e.g. a confirmation of the mapping). Note that the above techniques described in relation to FIGS. 9 and 10 are merely two examples; other suitable segmentation techniques over the transport network may be alternatively utilized.

Thus, in some implementations, QoS flows may be routed through the UPF to the policy enforcement across the SD-WAN fabric within the SD-WAN endpoint with use of VLANs (802.1q) or GRE tunnels. VLANs may be used to separate and segment traffic flows across multiple virtual LANs. As such, each separate entity through the UPF (slice/application/PDU session) and the SD-WAN endpoint (traffic policy rules) may be mapped to a separate VLAN for appropriate traffic management. VLANs may be configured with a VID which identifies the unique VLAN across the LAN segment (e.g. between the UPF and the SD-WAN endpoint). The PCP may be used to further ensure the application QoS mapping through the IP layer and the QoS flow configuration is extended to the VLAN frames. Alternatively, the UE IP packets between the UPF and the SD-WAN endpoint may be encapsulated into specific tunnels at the IP transport layer which permits routing within the service provider network, without requiring exposure of the UE IP address pool for routing purposes. Here, the GRE tunnel configuration may reflect policy and QoS configuration of the UPF and SD-WAN endpoint, for elements such as differentiated services code point (DSCP) marking and GRE tunnel allocation.

FIG. 8A is an illustrative representation of data item relationships 800A for QoS information in a mobile network. A QoS flow 830 may be associated with a QoS profile 832 and a set of QoS rules 834. In a 5G mobile network, a QoS flow may be considered the finest granularity of QoS differentiation in a PDU session, and identified by a QoS flow ID (QFI) 825. For a QoS flow, an SMF may provide the QFI 825 together with QoS profile 832.

FIG. 8B is an example of a PDU session message structure of a PDU session message 800B over an N3 interface between a gNB and a UPF, where the PDU session message may include a field or encapsulation header 804 having a QFI 820.

Referring back to FIG. 8A, QoS profile 832 may be indicated 842 as either a guaranteed bit rate (GBR) or a non-GBR. In the case where QoS profile 832 is a GBR profile, QoS profile 832 may include a 5G QoS identity (5GI) 844 (as well as other data, such as an allocation retention priority (ARP), a Guaranteed Flow Bit Rate (GFBR), a Maximum Flow Bit Rate (MFBR), and a notification control).

In some implementations, a specific SD-WAN policy may be mapped to and/or associated with any one or more QoS values, such as 5QI values or a set of 5QI values. FIG. 8C is a table 800C which provides example characteristics of QoS flows according to different 5QI values in a column 850. As shown, a set 872 of 5QI values 10-12 and 16-17 are associated with "delay critical GBR," a set 874 of 5QI values 1-4, 65-66, 7, and E and F are associated with "GBR," and a set 876 of 5QI values 5-9, 69-70, and 79-80 are associated with "Non-GBR." Each 5QI value as provided in column 850 is associated with a resource type in a column 852, a default priority level in a column 854, a packet delay budget in a column 862, a packet error rate in a column 864, a default maximum data burst volume in a column 866, and a default averaging window in a column 868.

Figure 11:
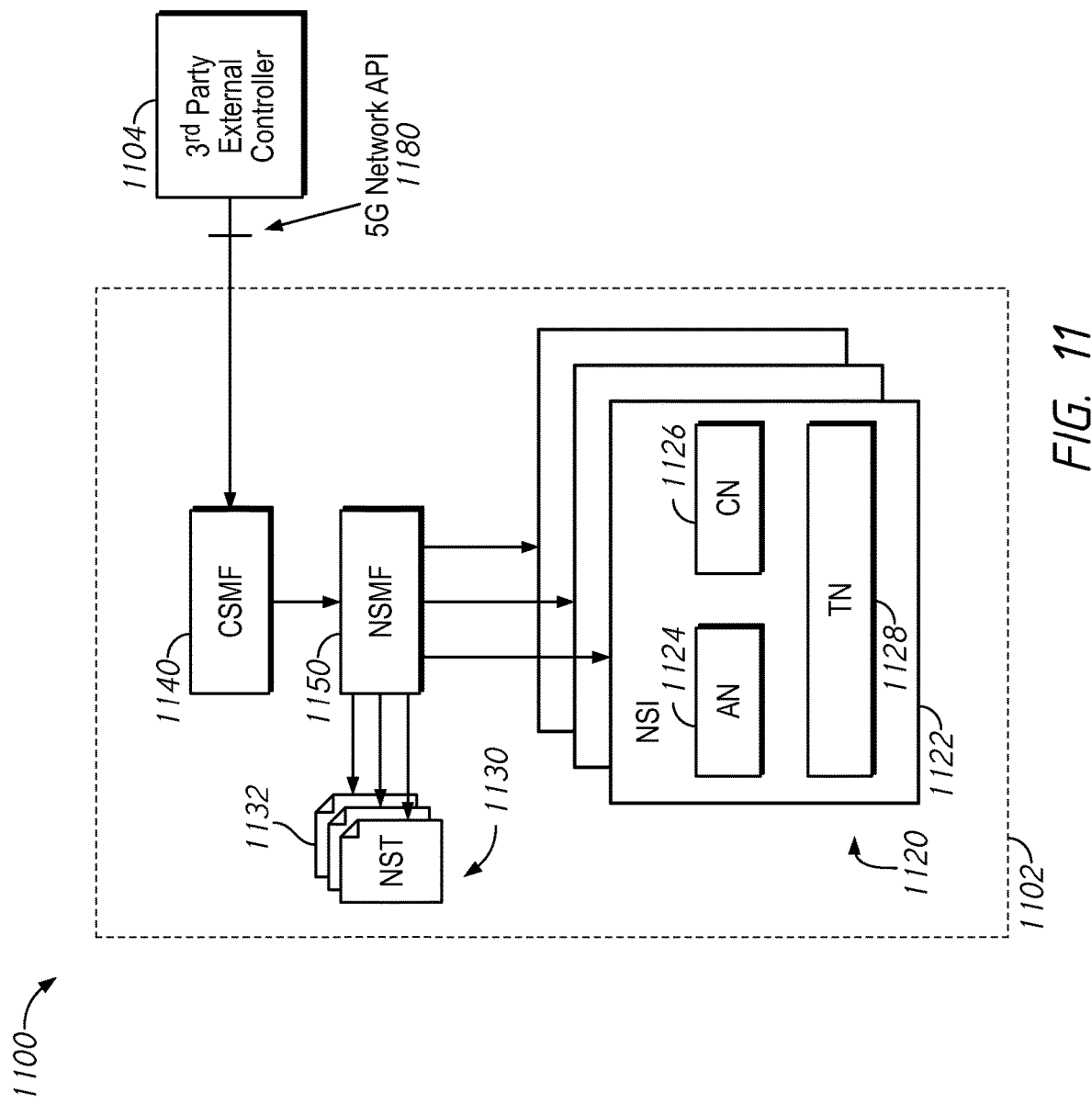
FIG. 11 is an illustrative representation of a system for use in configuring a mobile SD-WAN according to some implementations of the present disclosure.

Referring now to FIG. 11, an illustrative representation of a system 1102 for use in network slice management for mobile SD-WAN according to some implementations of the present disclosure is shown. System 1102 may include one or more processors, one or more memories coupled to the one or more processors, and/or one or more interfaces. At least part of the configuration method may be embodied as a computer program product including a non-transitory computer readable medium (e.g. memory, card, or disk, etc.) and instructions stored in the computer readable medium, where the instructions are executable on one or more processors of the system for performing the steps of the method.

In FIG. 11, system 1102 is shown to include a communication service management function (CSMF) 1140 and a network slice management function (NSMF) 1150. A device or controller 1104, such as a third-party external controller, may be configured to interface and communicate with system 1102 with use of a (5G network) API. CSMF 1140 may be configured to translate inputted service requirements into slice requirements through NSMF 1150, to define a network slice template (NST) 1132 and orchestration of a network slice instance (NSI) 1122. NSI 1122 is the instantiation of a network slice. NSF 1132 may describe the NSI 1122 with required instance specific policies and configurations.

A network slice is a logical network that includes a set of network functions, which may be Virtual Network Functions (VNFs) or Physical Network Functions (PNFs), and corresponding resources, such as compute, storage, and networking resources. It is "sliced out" from the "physical" network in order to provide specific capabilities and characteristics that the application running within the slice requires. Specific capability and characteristics may be or include customized connectivity with ultra-low latency, extreme reliability, and/or value-added services. A slice may also be viewed as a unique profile for an application, defined as a set of services within the network, or as a network function chain built to support a given use case, traffic type or a customer.

More specifically, NSI 1122 may be a deployed set of network functions and deliver network slice services according to a network slice blueprint. The network slice blueprint is a description of the structure, configuration, and the plans or work flows associate with how to instantiate and control NSI 1122 during its lifecycle. NSI 1122 contains access network (AN) 1124, core network (CN) 1126, and transport network (TN) 1128 functions and information relevant to the interconnections between these functions, such as the topology of connections and individual link requirements (e.g. QoS attributes).

Figure 12A:
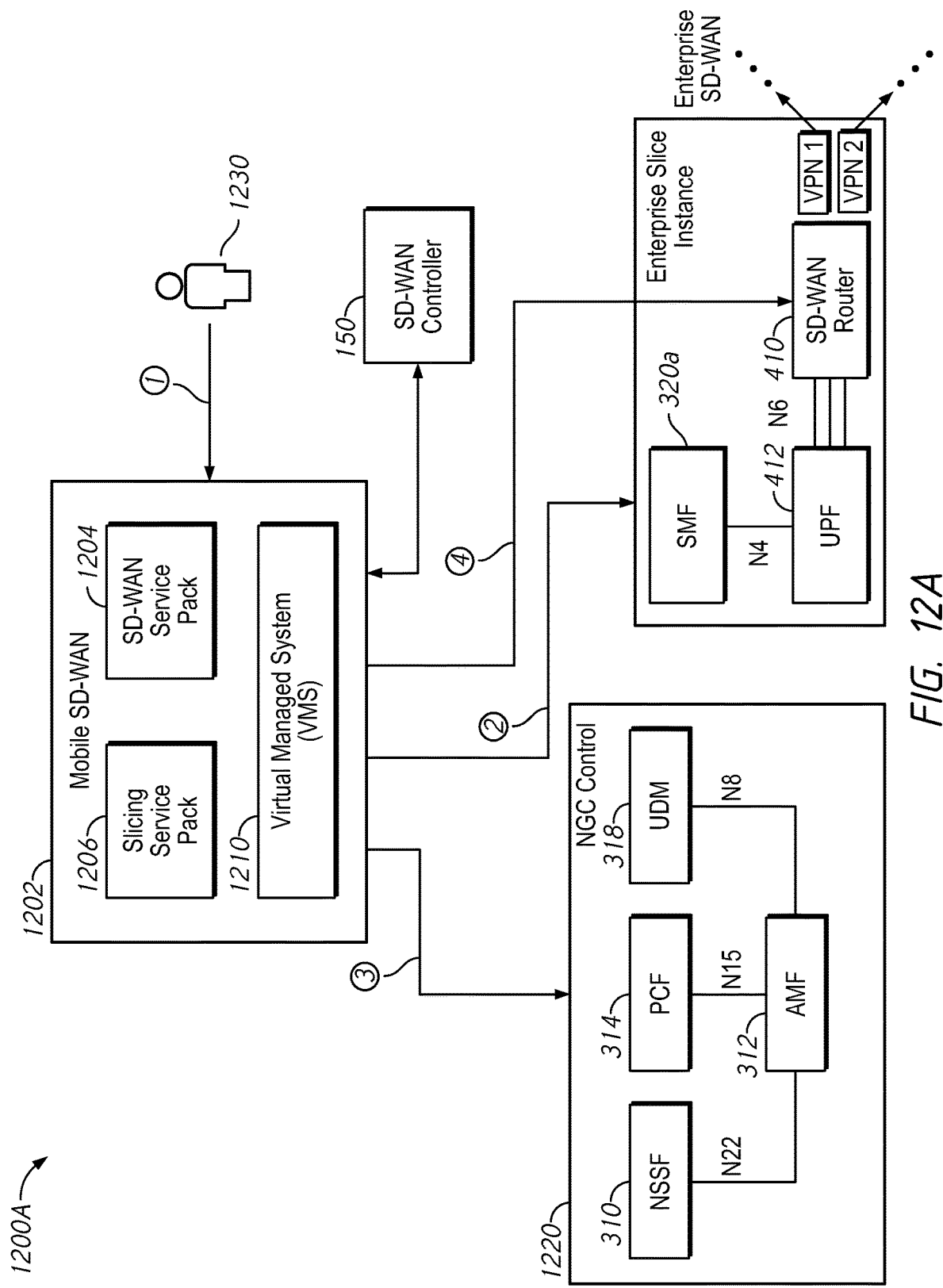
FIG. 12A is an illustrative representation of a system for use in network slice management for mobile SD-WAN according to some implementations of the present disclosure.

FIG. 12A is an illustrative representation of a system 1200A for use in configuring a mobile SD-WAN according to some implementations of the present disclosure. System 1200A may include one or more processors, one or more memories coupled to the one or more processors, and/or one or more interfaces. At least part of the configuration method may be embodied as a computer program product including a non-transitory computer readable medium (e.g. memory, card, or disk, etc.) and instructions stored in the computer readable medium, where the instructions are executable on one or more processors of the system for performing the steps of the method.

Notably, system 1200A may include a controller 1202 for mobile SD-WAN ("mobile SD-WAN controller") comprising a virtual managed system (VMS) 1210 for configuration of the mobile SD-WAN with use of an SD-WAN service pack 1204 and a slicing service pack 1206. Accordingly, a service may be offered by service providers to their business (e.g. enterprise) customers (e.g. a user or customer 1230) seamlessly with use of VMS 1210.

Figure 12B:
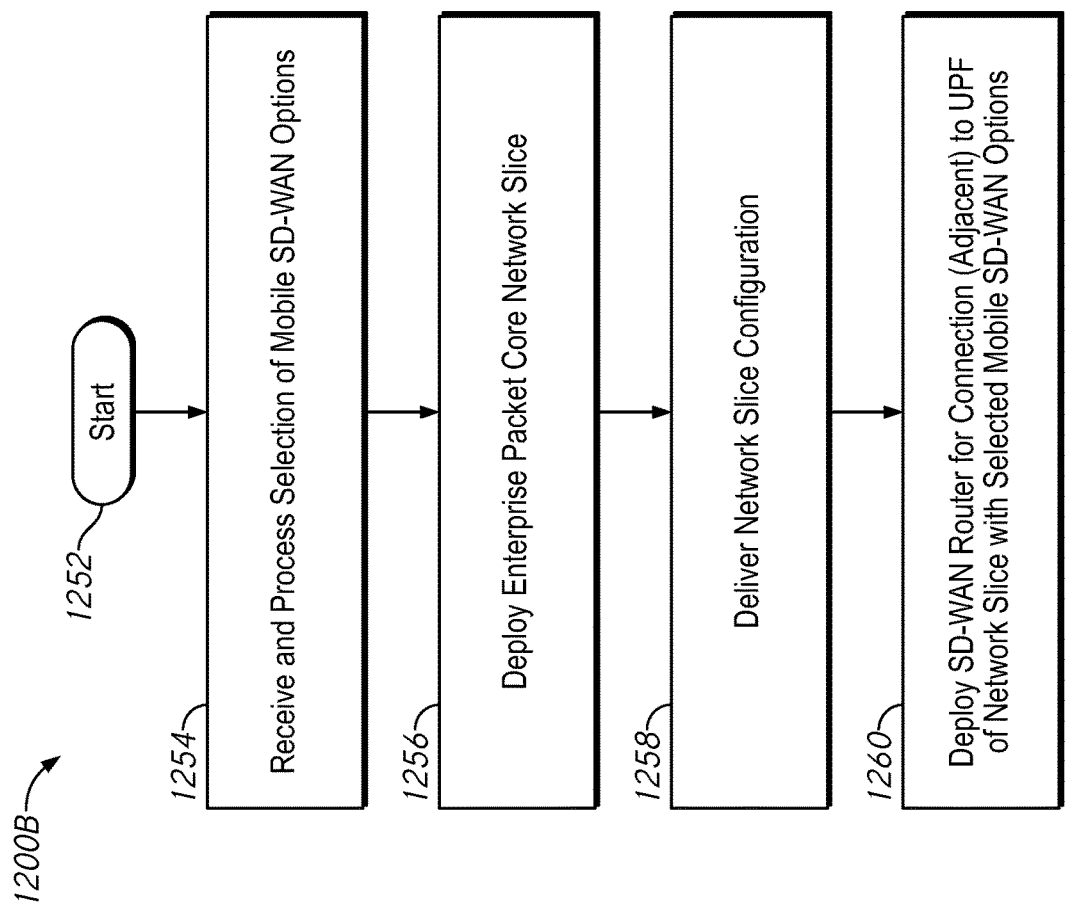
FIG. 12B is a flowchart for describing a method for configuring the mobile SD-WAN with use of the system of FIG. 12A.

FIG. 12B is a flowchart 1200B for describing a method for configuring a mobile SD-WAN with use of VMS 1210 in the system 1200A of FIG. 12A. Beginning at a start block 1252 of FIG. 12B, a selection of mobile SD-WAN options may be received from a user/customer and processed (step 1254 of FIG. 12B; step 1 of FIG. 12A). An enterprise (packet core) network slice instance may be deployed (step 1256 of FIG. 12B; step 2 of FIG. 12A). Network slice configuration information (e.g. identity, policy, QoS, etc.) may be delivered to the network slice instance (step 1258 of FIG. 12B; step 3 of FIG. 12A). An SD-WAN endpoint may be deployed for connection (e.g. adjacent) to UPF slice instance, and configured with the selected mobile SD-WAN options (step 1260 of FIG. 12B; step 4 of FIG. 12A). Authorization, policy, QoS, and traffic routing may thereafter be provided.

Figure 13A:
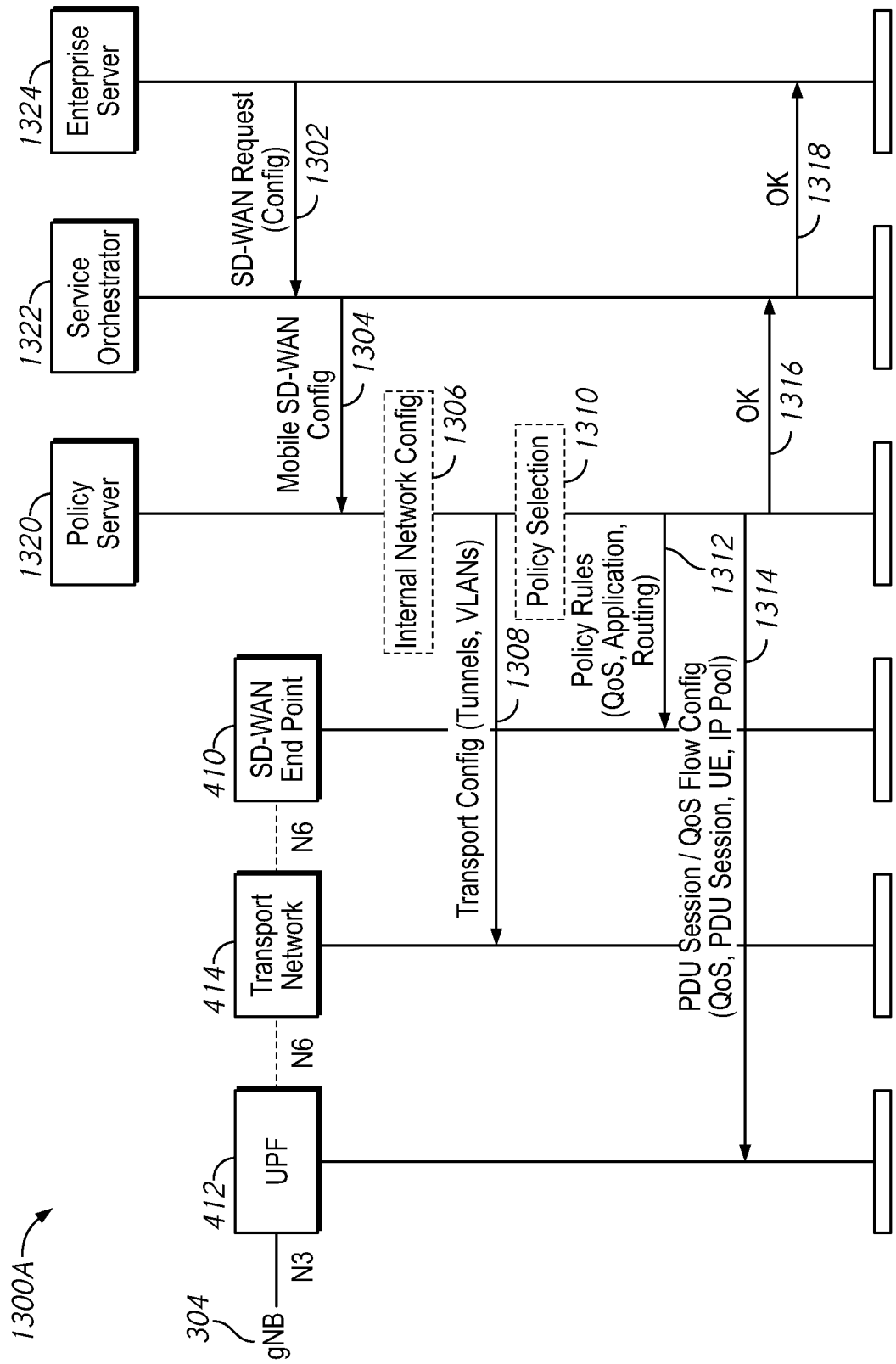
FIG. 13A is a message flow diagram for describing a method for use in interconnecting an SD-WAN fabric with a mobile network for communications with UEs based on policy mappings.

FIG. 13 is a message flow diagram 1300A for use in configuring a mobile SD-WAN, for use in interconnecting the SD-WAN fabric with a mobile network for communications with UEs based on policy mappings. In FIG. 13A, what is further shown in the system is a policy server 1320 (e.g. a PCF or other), a service orchestrator 1322, and an enterprise server 1324.

In the method of FIG. 13A, enterprise server 1324 may generate and send to service orchestrator 1322 a message which indicates an SD-WAN request for mobile SD-WAN configuration (step 1302 of FIG. 13A). In response, service orchestrator 1322 may generate and send to policy server 1320 mobile SD-WAN policy configuration information (step 1304 of FIG. 13A). After performing an internal network configuration (step 1306 of FIG. 13A), policy server 1320 may send to transport network 414 a message which includes transport network (policy) configuration information (e.g. tunnels, VLANS, etc.) (see e.g. discussion in relation to FIGS. 9 and 10) (step 1308 of FIG. 13A).

After policy selection at the policy server (step 1310 of FIG. 13A), policy server 1320 may send to endpoint 410 a message which includes policy rules (e.g. QoS, application, routing, etc.) (step 1312 of FIG. 13A). The SD-WAN policy rules may be or include specific application (5-tuple) categorization, together with the QoS requirements (latency, bandwidth, guaranteed rates), forwarding configuration, and the routing rules for SD-WAN transport selection. Policy server 1320 may send to UPF instance 412 a message which includes policy configuration (e.g. QoS flow configuration such as QoS, PDU session, and UE IP address pool) (step 1314 of FIG. 13A). The policy configuration at the UPF may be or include QoS requirements (latency, bandwidth, priority, etc.), PDU session identities, IP address pools, forwarding configuration, and the routing rules for application (5-tuple) categorization. After completion, policy server 1320 may send to service orchestrator 1322 a message indicating an acknowledgement (step 1316 of FIG. 13A). In turn, service orchestrator 1322 may send to enterprise server 1324 a message indicating an acknowledgement (step 1318 of FIG. 13A).

Figure 13B:
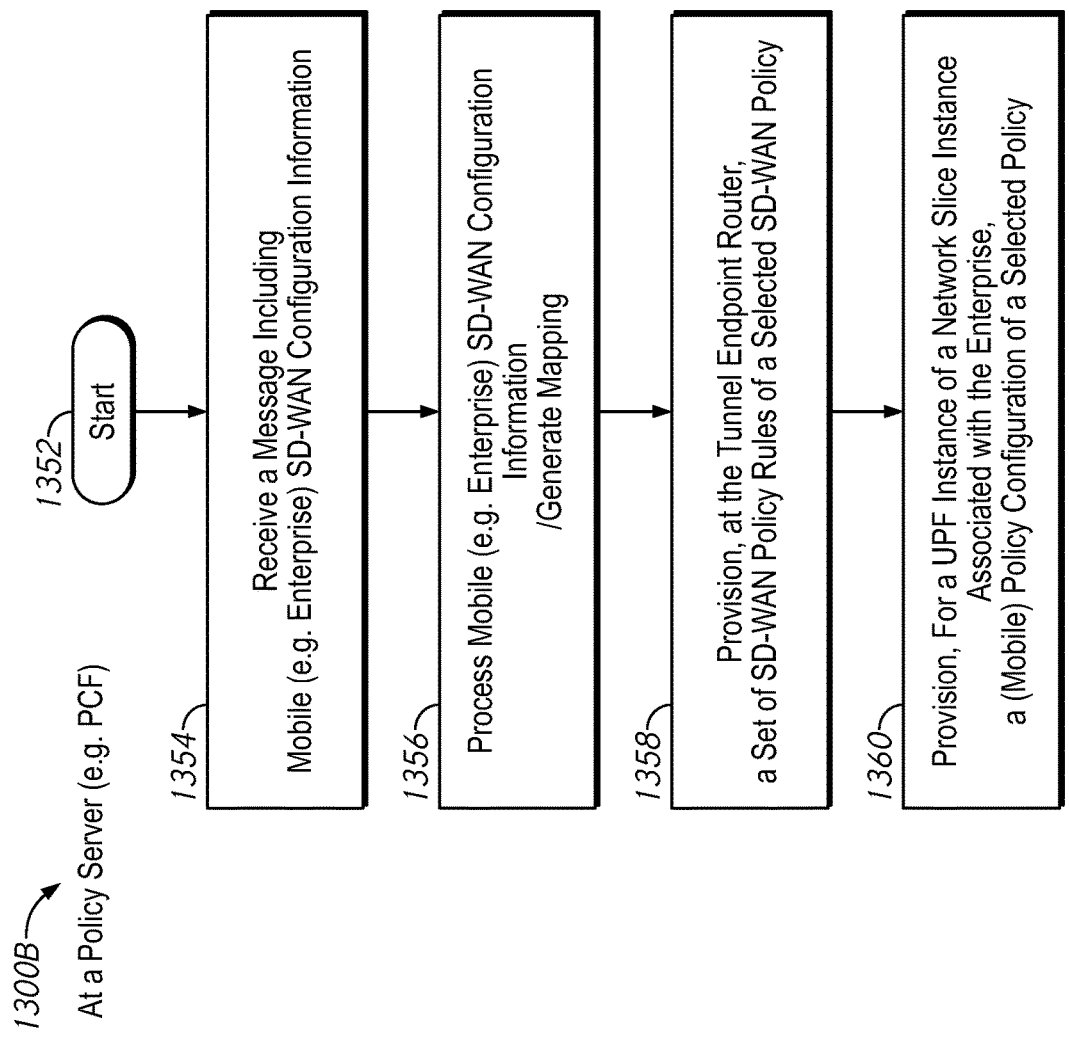
FIG. 13B is a flowchart of a basic method of the policy server which may correspond to some of the policy server steps of the method of FIG. 13A.

FIG. 13B is a flowchart 1300B of a basic method of the policy server 1320 which may correspond to some of the policy server steps of the method of FIG. 13A. The policy server may include one or more processors, one or more memories coupled to the one or more processors, and/or one or more interfaces. At least part of the basic method may be embodied as a computer program product including a non-transitory computer readable medium (e.g. memory, card, or disk, etc.) and instructions stored in the computer readable medium, where the instructions are executable on one or more processors of the system for performing the steps of the method.

From the operational perspective of the policy server, and beginning at a start block 1352 of FIG. 13B, the policy server may receive a message including mobile SD-WAN configuration information for configuring a mobile enterprise SD-WAN (step 1354 of FIG. 13B). The message may be received from a service orchestrator, in response to an original request from an enterprise service of an enterprise associated with the enterprise SD-WAN. In response to the message, the policy server may process the mobile enterprise SD-WAN configuration information and generate, associate, and/or identify any policy mappings (step 1356 of FIG. 13B). The policy server may provision the SD-WAN endpoint with a set of SD-WAN policy rules of the SD-WAN policy (step 1358 of FIG. 13B). The SD-WAN policy rules may be or include specific application (5-tuple) categorization, together with the QoS requirements (latency, bandwidth, guaranteed rates), forwarding configuration, and the routing rules for SD-WAN transport selection. The policy server may provision the UPF instance of a network slice instance associated with the enterprise with policy configuration information of a selected policy (step 1360 of FIG. 13B). The policy configuration at the UPF may be or include QoS requirements (latency, bandwidth, priority, etc.), PDU session identities, IP address pools, forwarding configuration, and the routing rules for application (5-tuple) categorization.

As is apparent, one notable aspect of the present disclosure in the mapping of traffic flows between the UPF (e.g. its specific slice) and the SD-WAN endpoint is the equal policy and routing information within each network element, and e.g. across the transport network between them. There is an agreement of policy configuration between the enterprise SD-WAN policy and the UPF PDU session and QoS flow configuration, which in turn may define any other necessary network mapping configuration (e.g. the two examples described above in relation to FIGS. 9-10).

Figure 14:
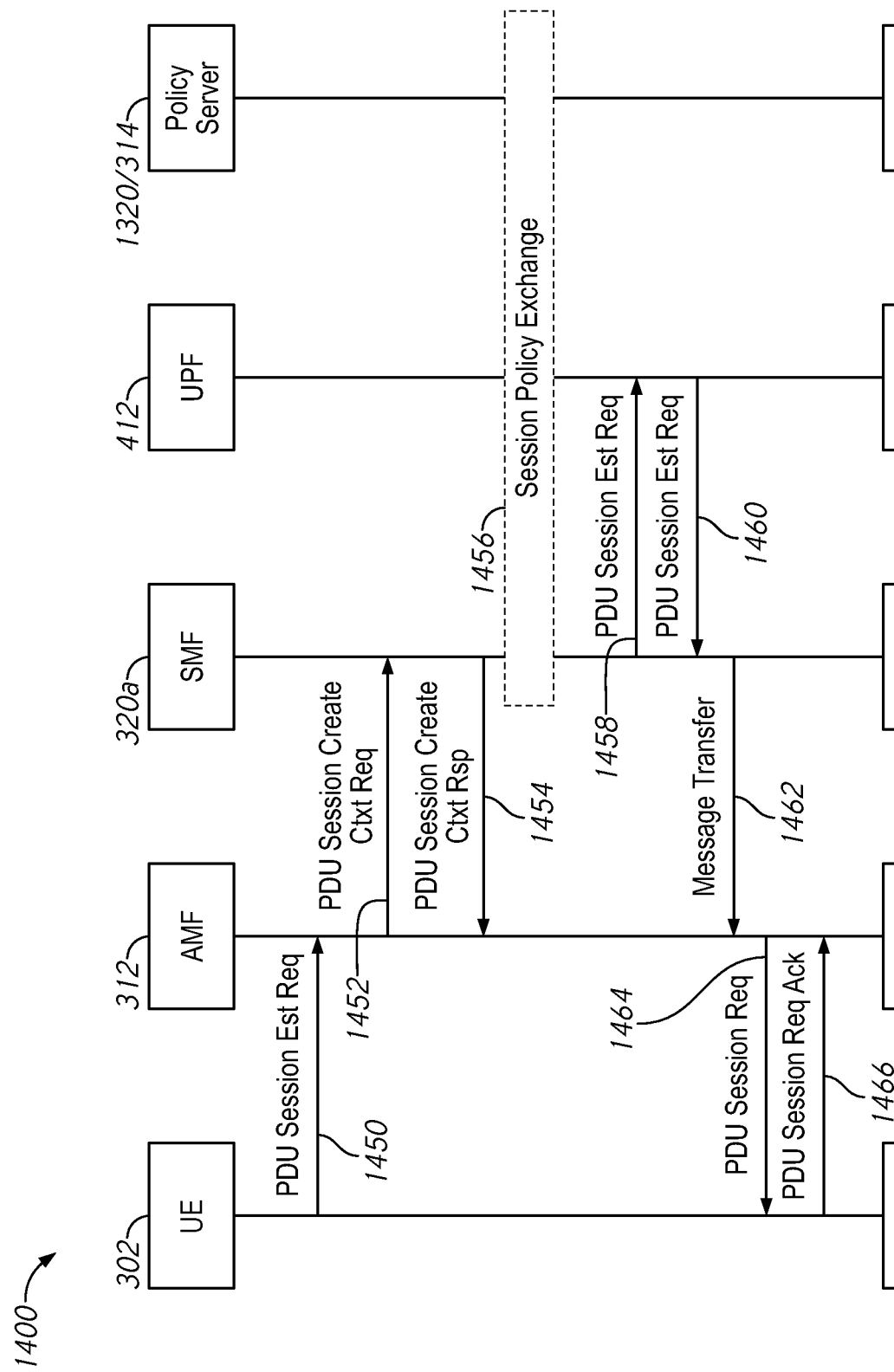
FIG. 14 is a message flow diagram 1400 for describing a PDU session establishment method for use in interconnecting an SD-WAN fabric with a mobile network for communications with UEs based on policy mappings.

FIG. 14 is a message flow diagram 1400 for describing a PDU session establishment method for use in interconnecting an SD-WAN fabric with a mobile network for communications with UEs based on policy mappings. In FIG. 14, UE 302 may send to AMF 302 a message which indicates a PDU session establishment request for establishing a PDU session (step 1450 of FIG. 14). In response, AMF 312 may send to SMF 320a a message which indicates a PDU session create context request (step 1452 of FIG. 14). In turn, SMF 320a may send to AMF 312 a message which indicates a PDU session create context response (step 1454 of FIG. 14). A session policy exchange may then take place between SMF 320a and policy server 1320 (PCF 314) (step 1456 of FIG. 14). Thereafter, SMF 320a may send to UPF instance 412 a message which indicates a PDU session establishment request (step 1458 of FIG. 14). In response, UPF instance 412 may send to SMF 320a a message which indicates a PDU session establishment response (step 1460 of FIG. 14). A message transfer from SMF 320a to AMF 312 may occur (step 1462 of FIG. 14). AMF 312 may then send to UE 302 a message which indicates a PDU session request (step 1464 of FIG. 14). In response, UE 302 may send to AMF 312 a message which indicates a PDU session request acknowledgement (step 1466 of FIG. 14). In this method, PDU session requirements are exchanged with policy server 1320 in order to configure UPF instance 412 with the 5G QoS Identity (5QI) and QoS Profiles for the PDU session. The PDU session capabilities are then mapped to the pre-configured mapping policies of UPF instance 412 and SD-WAN endpoint, in order to link the PDU session configuration to the mobile SD-WAN policies.

Various implementations of the present disclosure may realize one or more advantages. Notably, an SD-WAN may be extended into a mobile network for UE communications. UEs that were previously unmanaged by an enterprise may now be managed. Integrating with network slicing, the techniques may offer enterprise class segmentation and granularity in the mobile network. The technique may also ensure cloud scalability in order to deploy lower latency and edge compute services, integrated cloud services, and roaming partnership applications.

Thus, methods and apparatus for use in interconnecting SD-WAN fabrics with mobile networks for communications with UEs based on policy data mappings have been described.

In one illustrative example, an interface between a UPF instance of a mobile network and a tunnel router endpoint of an enterprise SD-WAN fabric is provided. The UPF instance may be part of a network slice that is (uniquely) associated with an enterprise of the enterprise SD-WAN. A plurality of policy data mappings between policies associated with different QoS flows via the UPF instance and SD-WAN policies associated with different VPNs of the SD-WAN fabric may be maintained. Each one of at least some of the VPNs may be associated with a different underlying transport mechanism that satisfies characteristics of a specific SD-WAN policy. Communications for UEs in the mobile network may be facilitated across the SD-WAN fabric based on the policy data mappings.

The UPF instance may be part of a network slice instance associated with an enterprise of the SD-WAN which comprises an enterprise SD-WAN. The QoS flows may be provided via a plurality of PDU sessions of the UPF instance. The plurality of mappings may be determined based on selecting QoS flows that correspond to matching or substantially matching SD-WAN policies of the SD-WAN. Also, the plurality of mappings may be dynamically updated in response to updates or changes to the SD-WAN policies. Again, each VPN may be associated with a different underlying transport mechanism that satisfies characteristics of a specific SD-WAN policy; as illustrative example, the SD-WAN policies may include a first SD-WAN policy associated with a first VPN for low latency communications and a second SD-WAN policy associated with a second VPN for high bandwidth communications. In some implementations, a transport network may be provided between the UPF instance and the tunnel endpoint router, and here, the mappings may be associated with a linking of an identifier of a virtual local area network (VLAN) or generic routing encapsulation (GRE) tunnel over the transport network.

As another illustrative example, a tunnel router endpoint may be configured to connect to a communication network to process communications for hosts according to a network overlay protocol in concert with other tunnel router endpoints to facilitate a plurality of network overlays comprising VPNs of a SD-WAN fabric. The tunnel router endpoint may be configured to receive, via an N6 interface from a UPF instance of a mobile network, a communication of data packets from an application of a UE. The tunnel router endpoint may be further configured to process and forward the data packets via a selected one of the VPNs in the SD-WAN fabric in accordance with a set of SD-WAN policy rules of a selected SD-WAN policy associated with the application. The selected SD-WAN policy rules may indicate use of the selected VPN having an underlying transport mechanism that satisfies the selected SD-WAN policy. The set of SD-WAN policy rules of the selected SD-WAN policy may be mapped to a policy configuration of a selected policy applied at the UPF; here, the policy configuration of the selected policy applied at the UPF may comprise a PDU session and QoS flow configuration for a PDU session and QoS flow of the data packets from the application of the UE.

The UPF instance may be a selected UPF instance of a network slice instance associated with an enterprise of which a subscriber associated with the UE is a member. The UE may be served by a base station and is associated with the PDU session with the UPF instance for the communication of the data packets via the QoS flow. The SD-WAN fabric may be an enterprise SD-WAN fabric of the enterprise, and the application may be an application associated with the enterprise. Each VPN may be associated with one of a plurality of different SD-WAN polices, and each SD-WAN policy may be associated with one of a plurality of different applications. The set of SD-WAN policy rules of the selected SD-WAN policy may be provisioned by a policy server of the mobile network.

In some implementations, the tunnel endpoint router may receive communications from the UPF instance via a transport network between the UPF instance and the tunnel endpoint router. Here, the tunnel endpoint router may receive the communication of data packets from the application of the UE by receiving the communication of data packets via one of a plurality of virtual local area networks (VLANs) with use of a VLAN ID associated with the VLAN, where the VLAN ID being included in the set of SD-WAN policy rules of the selected SD-WAN policy. Alternatively, the tunnel endpoint router may receive the communication of data packets from the application of the UE by receiving the communication of data packets via one of a plurality of generic routing encapsulation (GRE) tunnels with use of a GRE tunnel ID associated with the GRE tunnel, the GRE tunnel ID being included in the set of SD-WAN policy rules of the selected SD-WAN policy.

As even another illustrative example, a user plane function (UPF) instance may be provided for use in a mobile network. The UPF instance may interface, over the N6 interface of the mobile network, with a tunnel router endpoint which is configured to process communications for hosts according to a network overlay protocol in concert with other tunnel router endpoints to facilitate a plurality of network overlays comprising VPNs of a SD-WAN fabric. The UPF instance may be configured to receive, in a QoS flow of a PDU session, data packets from an application of a UE, process the data packets of the QoS flow of the PDU session, and send the processed data packets via the N6 interface to the tunnel router endpoint. The processing and sending may be performed in accordance with a policy configuration associated with a selected policy, where the policy configuration is a PDU session and QoS flow configuration at the UPF instance. The PDU session and QoS flow configuration of the selected policy may be mapped to a set of SD-WAN policy rules of a selected SD-WAN policy configured at the tunnel router endpoint, where the set of SD-WAN policy rules indicate use of a selected one of the plurality of VPNs that has an underlaying transport mechanism that satisfies the selected SD-WAN policy.

The UPF instance may be a selected UPF instance of a network slice instance associated with an enterprise of which a subscriber associated with the UE is a member. The SD-WAN fabric may be an enterprise SD-WAN fabric of the enterprise. Each VPN may be associated with one of a plurality of different SD-WAN polices, where each SD-WAN policy is associated with one of a plurality of different applications. The policy configuration may be provisioned at the UPF instance by at least one of a policy server and a session management function (SMF) of the mobile network.

Finally, another method for use in interconnecting an enterprise SD-WAN fabric with a mobile network for communications with UEs may involve: provisioning a UE with Single-Network Slice Selection Assistance Information (S-NSSAI) (which may have a specific Slice/Service Type and Slice Differentiator) which (uniquely) identifies a network slice associated with an enterprise or enterprise SD-WAN; in response to a message indicating a request for a session for the UE, selecting a network slice based on the S-NSSAI, wherein the network slice includes a UPF instance connected to a tunnel endpoint router for the enterprise SD-WAN; and facilitating communications for the UE in the mobile network across the enterprise SD-WAN based on policy mappings between the selected UPF instance and the tunnel router endpoint for the enterprise SD-WAN.

Implementations of the present disclosure have been shown in the figures to apply to a 5G mobile network; however, implementations may be readily applied to other suitable types mobile networks, such as 4G, Long Term Evolution (LTE) based networks having a control and user plane separation (CUPS) architecture, as one ordinarily skilled in the art will readily appreciate. In such implementations, the UPF may instead be a gateway-user plane (GW-U), the SMF may instead be a GW-control plane (GW-C), the AMF may instead be a mobility management entity (MME), the PCF may instead be a policy and control rules function (PCRF), or any combination of the above, and utilize the interfaces as defined by the standards.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented, and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first UE could be termed a second UE, and, similarly, a second UE could be termed a first UE, without changing the meaning of the description, so long as all occurrences of the "first UE" are renamed consistently and all occurrences of the second UE are renamed consistently. The first UE and the second UE are both UEs, but they are not the same UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a user plane function (UPF) for use in a mobile network,
   receiving data packets from an application of a user equipment (UE) in a Quality of Service (QoS) flow of a Protocol Data Unit (PDU) session; and
   processing and sending the data packets in the QoS flow to a tunnel router endpoint, which is configured to process communications for hosts according to a network overlay protocol in concert with other tunnel router endpoints to provide a plurality of network overlays for virtual private networks (VPNs) of a software-defined wide area network (SD-WAN) fabric,
   wherein the processing and sending are performed in accordance with a QoS flow configuration associated with a selected QoS policy of a plurality of QoS policies, and
   wherein the QoS flow configuration of the selected QoS policy is selected according to a mapping to an SD-WAN policy comprising a set of policy rules configured at the tunnel router endpoint, the set of policy rules of the SD-WAN policy being associated with one of the VPNs that has an underlaying transport mechanism that satisfies the SD-WAN policy.

2. The method of claim 1, wherein the UPF comprises a selected UPF instance of a network slice instance that is allocated for use by the SD-WAN fabric which comprises an enterprise SD-WAN fabric of an enterprise.

3. The method of claim 1, wherein the application comprises an enterprise SD-WAN application of the SD-WAN fabric which comprises an enterprise SD-WAN fabric of an enterprise.

4. The method of claim 1, wherein each one of the VPNs is associated with a respective one of a plurality of SD-WAN policies, and each one of the plurality of SD-WAN policies is associated with a respective one of a plurality of applications for the UE.

5. The method of claim 1, wherein the selected QoS policy is associated with a respective one of a plurality of 5G QoS Identities (5QIs) associated with the plurality of QoS policies.

6. The method of claim 1, further comprising:
   at the UPF,
   receiving, from a session management function (SMF), the QoS flow configuration of the selected QoS policy for the processing and sending of the data packets in the QoS flow.

7. The method of claim 6, further comprising:
   at the SMF,
   receiving, from a policy control function (PCF), the selected QoS policy; and
   configuring the UPF with the QoS flow configuration of the selected QoS policy for the processing and sending of the data packets in the QoS flow.

8. The method of claim 1, further comprising:
   wherein sending the data packets comprises sending the data packets via one of a plurality of virtual local area networks (VLANs) with use of a VLAN ID associated with the VLAN, the VLAN ID being associated with the set of policy rules of the SD-WAN policy, or
   wherein sending the data packets comprises sending the data packets via one of a plurality of generic routing encapsulation (GRE) tunnels with use of a GRE tunnel ID associated with the GRE tunnel, the GRE tunnel ID being associated with the set of policy rules of the SD-WAN policy.

9. A user plane function (UPF) node comprising:
   one or more interfaces to connect to a mobile network for communication;
   one or more processors configured for:
   receiving data packets from an application of a user equipment (UE) in a Quality of Service (QoS) flow of a Protocol Data Unit (PDU) session; and
   processing and sending the data packets in the QoS flow to a tunnel router endpoint, which is configured to process communications for hosts according to a network overlay protocol in concert with other tunnel router endpoints to provide a plurality of network overlays for virtual private networks (VPNs) of a software-defined wide area network (SD-WAN) fabric,
   wherein the processing and sending are performed in accordance with a QoS flow configuration, at the UPF node, associated with a selected QoS policy one of a plurality of QoS policies, and
   wherein the QoS flow configuration of the selected QoS policy is selected according to a mapping to an SD-WAN policy comprising a set of policy rules configured at the tunnel router endpoint, the set of policy rules being associated with one of the VPNs that has an underlaying transport mechanism that satisfies the SD-WAN policy.

10. The UPF node of claim 9, wherein the UPF comprises a selected UPF instance of a network slice instance that is allocated for use by the SD-WAN fabric which comprises an enterprise SD-WAN fabric of an enterprise.

11. The UPF node of claim 9, wherein the application comprises an enterprise SD-WAN application of the SD-WAN fabric which comprises an enterprise SD-WAN fabric of an enterprise.

12. The UPF node of claim 9, wherein each one of the VPNs is associated with a respective one of a plurality of SD-WAN policies, and each one of the plurality of SD-WAN policies is associated with a respective one of a plurality of applications for the UE.

13. The UPF node of claim 9, wherein the selected QoS policy is associated with a respective one of a plurality of 5G QoS Identities (5QIs) associated with the plurality of QoS policies.

14. The UPF node of claim 9, the one or more processors being further configured for:
   receiving, from a session management function (SMF), the QoS flow configuration of the selected QoS policy for the processing and sending of the data packets in the QoS flow.

15. The UPF node of claim 9, wherein:
   processing and sending the data packets comprises sending the data packets via one of a plurality of virtual local area networks (VLANs) with use of a VLAN ID associated with the VLAN, the VLAN ID being associated with the set of policy rules of the SD-WAN policy, or
   processing and sending the data packets comprises sending the data packets via one of a plurality of generic routing encapsulation (GRE) tunnels with use of a GRE tunnel ID associated with the GRE tunnel, the GRE tunnel ID being associated with the set of policy rules of the SD-WAN policy.

16. A method comprising:
at a session management function (SMF) for use in a mobile network,
   receiving, from a policy control function (PCF), a selected Quality of Service (QoS) policy of a plurality of QoS policies; and
   configuring a user plane function (UPF) with a QoS flow configuration associated with the selected QoS policy, for processing and sending of data packets from an application of a user equipment (UE) in a QoS flow to a tunnel router endpoint, which is configured to process communications for hosts according to a network overlay protocol in concert with other tunnel router endpoints to provide a plurality of network overlays for virtual private networks (VPNs) of a software-defined wide area network (SD-WAN) fabric,
   wherein the QoS flow configuration of the selected QoS policy is selected according to a mapping to an SD-WAN policy comprising a set of policy rules configured at the tunnel router endpoint, the set of policy rules being associated with one of the VPNs that has an underlaying transport mechanism that satisfies the SD-WAN policy.

17. The method of claim 16, wherein configuring comprises configuring the UPF which comprises a selected UPF instance of a network slice instance that is allocated for use by the SD-WAN fabric comprising an enterprise SD-WAN fabric of an enterprise.

18. The method of claim 16, wherein the application comprises an enterprise SD-WAN application of the SD-WAN fabric which comprises an enterprise SD-WAN fabric of an enterprise.

19. The method of claim 16, wherein each one of the VPNs is associated with a respective one of a plurality of SD-WAN policies, and each one of the plurality of SD-WAN policies is associated with a respective one of a plurality of applications for the UE.

20. The method of claim 16, wherein the selected QoS policy is associated with a respective one of a plurality of 5G QoS Identities (5QIs) associated with the plurality of QoS policies.

* * * * *